United States Patent [19]

Kaplow et al.

[11] 4,202,041

[45] May 6, 1980

[54] DYNAMICALLY VARIABLE KEYBOARD TERMINAL

[75] Inventors: Roy Kaplow, Newton; Michael K. Molnar, Cambridge, both of Mass.

[73] Assignee: Massachusetts Institute of Technology, Cambridge, Mass.

[21] Appl. No.: 814,723

[22] Filed: Jul. 11, 1977

[51] Int. Cl.² .................. G06F 3/14; G06F 13/06
[52] U.S. Cl. .................................... 364/900
[58] Field of Search ... 364/200 MS File, 900 MS File; 197/98; 340/365 R, 324 A

[56] References Cited

U.S. PATENT DOCUMENTS

| | | | |
|---|---|---|---|
| 3,325,786 | 6/1967 | Shashoua et al. | 364/900 |
| 3,534,396 | 10/1970 | Hart et al. | 364/200 |
| 3,631,457 | 12/1971 | Hamada et al. | 340/324 A |
| 3,731,299 | 5/1973 | Bouchard et al. | 340/324 A |
| 3,757,322 | 9/1973 | Barkan et al. | 340/365 C |
| 3,760,360 | 9/1973 | Reynolds et al. | 340/365 R X |
| 3,766,528 | 10/1973 | Ichida | 364/900 |
| 3,773,989 | 11/1973 | Hacon | 340/365 R X |
| 3,777,222 | 12/1973 | Harris | 340/365 S X |
| 3,811,113 | 5/1974 | Saito et al. | 364/900 |
| 3,859,635 | 1/1975 | Watson et al. | 364/200 |
| 4,028,695 | 6/1977 | Saich | 340/324 A X |
| 4,070,710 | 1/1978 | Sukonick et al. | 364/900 |

OTHER PUBLICATIONS

Crook, Ken, "CRT Touch Panels Provide Maximum Flexibility in Computer Interaction", Control Engineering, Jul. 1976, pp. 33-34.

*Primary Examiner*—Gareth D. Shaw
*Assistant Examiner*—Thomas M. Heckler
*Attorney, Agent, or Firm*—Arthur A. Smith, Jr.; Robert F. O'Connell

[57] ABSTRACT

A dynamically variable keyboard terminal system having a keyboard display unit using an input panel with a plurality of touch-sensitive locations thereon and a keyboard display unit in alignment therewith. The system includes means for generating and storing information concerning symbols which make up one or more working symbol sets, such symbol information being author definable in accordance with a predetermined terminal definition language. The symbol information can include a symbol configuration for display, if applicable, or a symbol action to be performed, if applicable. Means are also provided for generating and storing information concerning a plurality of keyboard images which use such symbols and which keyboard information can be used for displaying a keyboard image at the keyboard display unit. A user can selectively touch one or more such locations so as to obtain symbol information for display on the keyboard display unit or on a monitor display unit, if applicable, or for performing an action associated with such symbol, if applicable.

12 Claims, 18 Drawing Figures

DYNAMICALLY VARIABLE KEYBOARD TERMINAL

The Government has rights in this invention pursuant to Grant No. J-43163 and IPA-0010 awarded by the National Science Foundation.

BACKGROUND OF THE INVENTION

The field of this invention is the computer terminal and particularly interactive terminals which permit access and operation with respect to computers by operators using as an input device a keyboard or some such form of data entry arrangement by which the operator can utilize the power available in the computer and its associated memory and software.

In the prior art, one standard form of computer terminal has been a keyboard device of the teletype or typewriter variety and at present such devices have the ability to provide the USASCII, 1968 STANDARD SET OF NINETY-FIVE PRINTABLE CHARACTERS OR SOME PORTION THEREOF. This standard set of symbols which has evolved from the typewriter with its keyboard and symbol set is generally associated with a video display output device which will display the selected characters in the form of the text which has been entered by the keyboard and conventional arrangements for editing, erasing and other operations.

The limitations of prior art terminals may not have seemed unduly restrictive in many quarters. Indeed, the concept of defining the available symbols, or groups of symbols, to have special meanings under particular circumstances has allowed the standard symbol set to do more than double duty. Thus ↑ and ** and .P. have all three been used to mean "raise to the power"; "O backspace -" may mean "the Greek letter theta"; "INT (a,b,f,x)" may mean $$\int_a^b f(x)";$$

and "A.SUB.i+j" may mean "$A_{i+j}$". In an environment in which much of the serious communication from the user to the computer is still referred to as "writing code" such conventions are readily accepted. And yet, there are signs that the situation is increasingly less satisfactory, particularly as the user group becomes less dominated by computer professionals and demi-professionals.

The alternate forms in which the standard symbol sets are used are not desirable in instructional applications, for example, because they require the student to learn extraneous codes and because they stress notational schemes different from those used in the published literature and in textbooks. They are also troublesome because the particular notational conventions are relatively arbitrary; the convention adopted by one author is likely to be different from his colleagues' and different from the conventions used in algorithmic programming languages, such as Fortran, Cobol, MAD, etc. These languages, in turn, use conventions which differ from one to another. Thus, the use of a limited, standard symbol set which does not include the natural symbols (or positioning) of particular applications paradoxically tends to lead to a diversity rather than a uniformity of notation. This is distracting and confusing, particularly in an educational situation.

Another interesting type of example, which stresses the differences between display and input capabilities, can be drawn from a report on a sophisticated, multi-character cathode-ray-type display terminal developed at the MIT Electronic Systems Laboratory, for use in libraries, as part of the Intrex project (See "A Translator Program for Displaying a Computer Stored Set of Special Characters" Mobyuki, Goto, Report ESL-R-429, Massachusetts Institute of Technology, 1970). The partial line of text illustrated below (in quotes) represents a significant step beyond the display capability of run-of-the-mill terminals. The use of superscripts and subscripts and of nonstandard symbols allows the chemical formula in the line to be represented on the display in its standard form:

"... in the system $Mn_xFe_{3-x}O_{4+\gamma}$ for $<1$ ..."

The same report also explains how that information must be input:

"... in the system Mn*sub x*Fe*sub 3−x*O*sub 4+ *gamma** for x *less than* 1 ..."

The augmented display capability illustrated above is certainly valuable in its own right. However, there is less advantage in its use if the user must train himself to use the different inputting code. It is perhaps surprising that the latter form is as readable as it is; for a person unfamiliar with chemistry it might even be more readable than the correctly displayed form. As an input scheme for "chemists", however, spelling out the nonstandard symbols and format in English-like text is at best a tedious and error-prone option.

Other schemes, deviating further and further from the standard symbol set, have been developed in response to the continuing pressure for more and different input symbols. One approach has been to replace the entire standard keyboard symbol set with another one, specially designed for a specific application. Perhaps the best known example of this is an APL terminal, for which the keyboard labels and type head are changed to provide a unique set of symbols, the symbol set of the APL programming language.

Another approach has been to add more keys to the keyboard. Some of the extra keys may be assigned high-level operational meaning, such as log x or $e^x$. Experimental terminals for engineering applications have been developed with as many as 250 "side" keys, alongside the standard keyboard. Nonetheless, such keyboards are still mainly limited to the fixed, though larger, symbol set which happens to be included. An additional disadvantage to this, as a general approach, is simply the distraction that is presented by so formidable an array of keys, only a fraction of which are likely to be used in any brief period of time.

A related scheme has been to assign multiple sets of meanings to a fixed number of keys. This is an extension of the ordinary "shift" concept which allows each key to represent two different symbols, depending on whether the shift key is depressed or not. With multiple meanings, the user may be required to type a special code—e.g., LEVEL III—to indicate that he desires to switch to a particular set of meanings for the keys. It is difficult to provide many readable labels per key, however, so the basic limitation remains.

An interesting attempt to provide a multiplicity of key labels for a multi-"shift"-level scheme has been made by the Philco Houston Operations of the Philco-Ford Corporation (See "New Conception Man-Machine Interface Devices", Developments Section, *Computer Designs,* 7, 32; 1968). Their device consists of a "keyboard" comprising two 4×4 arrays of push buttons and an (exchangeable) ten page "book" of plastic sheet label overlays which have holes through which the buttons can protrude. The book spline locks into the center of the keyboard (between the two separate 4×4 button arrays). When the book is open to a given pair of pages the overlays provide the key labels. Mechanical cams attached to the book spline and to the individual pages actuates switches under the keyboard to identify the particular book pad pages selected.

In a related but more recent approach, workers at the Bell Telephone Laboratories have assembled a device in which key labels are projected onto a mechanical-key keyboard, while the use of partially-silvered mirrors allows the user to see his hand, the keys, and the labels—all simultaneously (See Knowlton, K., "Virtual Pushbuttons as a Means of Person-Machine Interaction", Proceedings Computer Graphics, Patterson Recognition and Data Structure Conference, Beverly Hills, California, 1975).

Another approach, used with CRT and other display terminals, has been to generate "soft-copy" input areas, in which special symbols or function names are displayed on a reserved section of the CRT screen and selected by pointing at them with a light-pen, or by moving a cursor controlled by a "joy-stick" or trackball, or by interrrupting a light beam in an array, or by a similar technique. The previously mentioned MIT Project-Intrex BRISC terminal extended this idea by displaying variable labels to identify a set of extra push buttons mounted along the bottom of the CRT screen. "Soft-copy" input modes implemented on the display in these various ways can provide an additional richness and flexibility in the input symbol set but are generally slower to work with than separate keyboards and are often not suitable for routine input. They are thus used in combination with a standard keyboard, which results in the user having to transfer back and forth from one type of input device to the other—he must drop the light pen to type, for example, and vice versa. More importantly, information input in that fashion is usually handled in a manner that is not homogeneous with normal input. That is, with normal input-handling software a key push is simply converted into a binary-bit code, unique to the particular symbol selected, and appended—if appropriate—to a symbol string input-stream. Such a string is subsequently amenable to the usual range of "character-handling" operations, and, of course, it can be edited later or redisplayed. In contrast, with input schemes like those referred to immediately above, the controlling software routine is likely to be a specialized one, designed in conjunction with the specific picture then being displayed, and directly carrying out one branch of the program or another, depending on the numerical x and y values of the screen locations selected.

A second basic type of flaw in the usual input device is the lack of format flexibility. The user faces a fixed key layout, usually with fixed key labels; an instrument based on a design for putting English prose onto paper. As it happens, the standard symbol layout used is not ideally suited even for that purpose, but that quantitative detail is almost irrelevant in the present context. It is important, however, to consider the possibility that touch-input communications to a computer may be qualitatively enhanced through the use of formats more closely related to the specific interactions underway.

A third major flaw regarding standard, all-purpose keyboards, is that they are detrimental to the efficiency of human-computer interaction, especially in consideration of errors and the fallibility of human memory. In particular, it is not desirable to always present the user with a single keyboard through which he can send any communication which is, which has ever been, and which might ever be a valid statement. Such keyboard does not provide any clues as to what input is meaningful at a given instant in a given process, although the computer software is often very "knowledgeable" and sensitive about which is legitimate and what is not. At the same time, the very generality of the standard keyboard provides unlimited opportunity for error.

SUMMARY OF THE PRESENT INVENTION

The enhanced-input-terminal of the present invention provides major new degrees of freedom for touch-type input, especially for on-line use of interactive computer programs and comprises an integrated system of hardware and software. The primary input device is a "cross-wire", touch-sensitive panel, overlaying a video display. A companion video unit is used for output display. These are supported by page-refresh memories, written (and read) directly by a suitable data processor which implements the software logic. The enhanced-input-terminal allows the user to define an essentially infinite set of symbols and an unlimited variety of "keyboard" formats. In spite of the generality of input content and format, the integrated system develops a standard-type of binary-bit-coded input stream, in which the individual "symbols" are uniquely and canonically represented. As symbol-strings or as a text-file, the input stream is amenable to all of the usual "character-handling" operations, such as substring, concatenate, etc., and to operations of editing, transmission and output.

The system includes a unique "Terminal Definition Language" and compiler, with which one can define new symbols, keys, chords (as later defined), and keyboard images, all comprising an author working set of keyboard images and symbols for a user process. Thus, a specific set of symbols, keyboard formats, key labels, and local operational functions can be defined for each task and suitably stored to form a data base for the system.

The objects and features of the invention are thus to provide a terminal having available:

(1) Working symbol set stored in the data base, the symbols making up such set being author-definable and the set being virtually unlimited in terms of the number of symbols or the visual aspect of the symbols;

(2) Keyboard descriptions permitting such keyboards to be displayed or drawn on a keyboard display unit, the keyboard formats being essentially completely arbitrary, allowing an essentially unlimited number of possibilities ranging from the standard key layout of a typewriter, to drawings, templates, or any format oriented to inputting a problem and working through to a solution by interaction with the computer;

(3) Descriptions for using keyboards, the keyboards being dynamically switchable, keeping pace with the user's path through an interaction, being specifically relevant to the then current aspect of the task;

(4) Sub-routines for use in the presentation of symbols from the symbol set. Input actions by the user generate a binary coded input stream which is explicitly meaningful in terms of the defined symbol set, and which has the attributes of an ordinary text that one applies to text files (or symbol strings) such as:
   (a) character-handling operations (e.g., length, concatenate)
   (b) string comparison (e.g., for response analysis and interpretations)
   (c) editing
   (d) outputting (including display format control).

Input is canonicalized, so that a given symbol is always represented identically internally, regardless of the keyboard-image used to input it and regardless of the locations of the keys on different keyboards within a given working set. In addition, to the extent allowed by logical consistency, symbols may also be canonicalized among two or more different working sets; indeed, the ASCII set is automatically canonicalized among all working sets.

DETAILED DESCRIPTION OF THE PREFERRED EMBODIMENT

Figure 1:
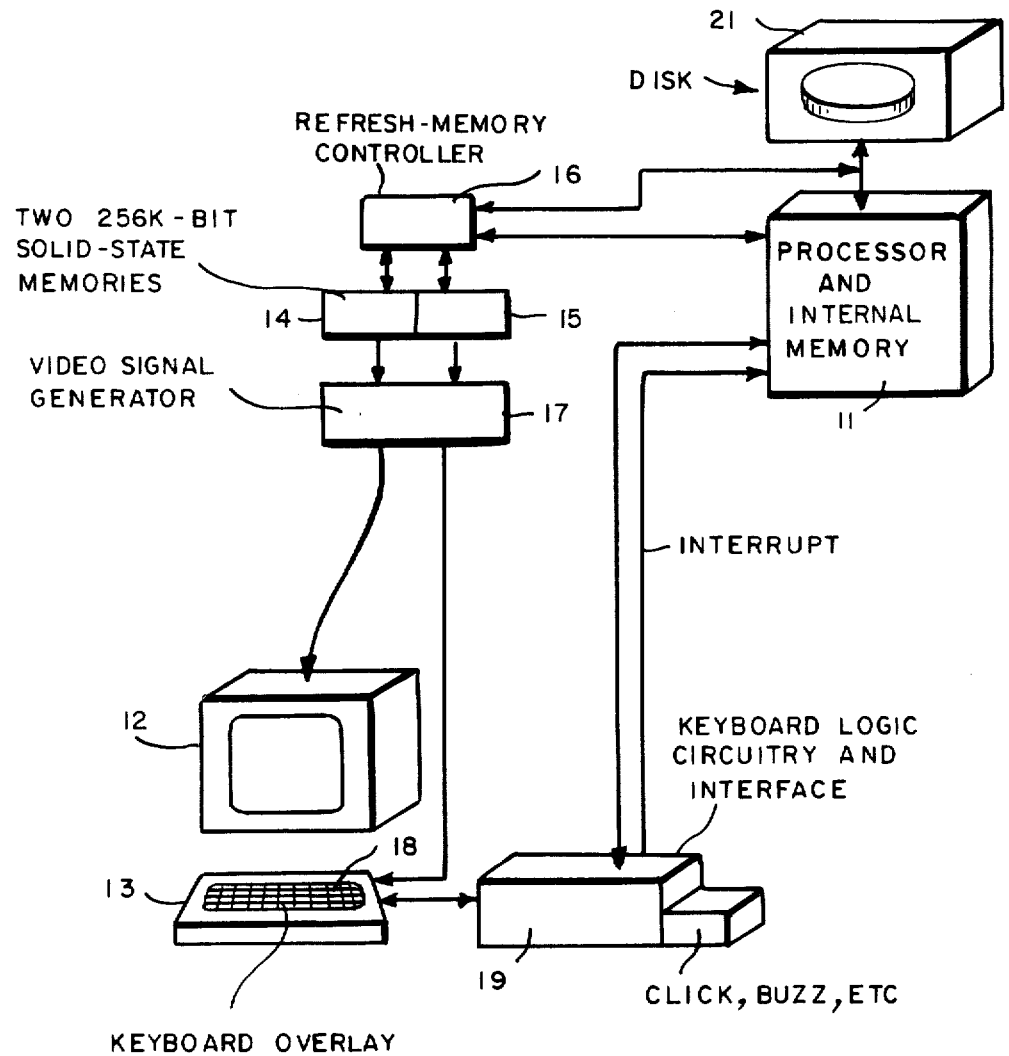
FIG. 1 is a system block diagram of a preferred embodiment of the invention.

The system shown in FIG. 1 consists of three main parts: a processor 11 which in a particular embodiment may be, for example, a processor made and sold by Digital Equipment Corporation of Maynard, Massachusetts under the model designation PDP 11/40. Such processor has appropriate data storage media, including, for example, a peripheral disk storage memory unit 21 as well as processor internal core memory. Two video monitor display units 12,13 with solid-state, page-refresh memories 14,15 and a memory control circuit 16 for controlling the insertion of data from the data base into the refresh memories, a video readout and signal generator 17, and a "keyboard" overlay 18 with associated keyboard logic control and processor interface circuitry 19 are also included in the system. Controller 16 and its interface circuitry is of a standard type and includes ten registers directly accessible by the processor and through which information is transferred to and from the refresh memories. The keyboard overlay 18 as used in conjunction with the video display 13 makes up the keyboard display unit which operates as the terminal's primary input device for use by the terminal operator.

The processor 11 provides its computational power, program and library storage media, and storage access mechanisms in a conventional manner. A PDP 11/40 data storage media, for example, can include 28 k bytes of internal core memory and 4.8 megabytes of fast disk storage 21. The processor 11 is programmed in assembly language and utilizes a standard disk-operating system for disk storage 21. With the core memory and disk storage, the processor 11 provides most of the operational logical power, the character and display processing, and the computational requirements of the terminal. Details of the operation of particular processors are normally well known to the art and that of the PDP 11/40, for example, can be found in the operating instruction manual and other information normally supplied to users thereof by the manufacturer. Accordingly, details thereof are not further needed here.

The user interface comprises the two video display monitors 12 and 13. The monitor 12 serves the normal display functions of a terminal while the monitor 13 is the basis for the dynamically variable input keyboard. Each monitor is backed up by a 256 K-bit solid-state "refresh" memory 14, 15 and video-driver circuitry 17 which develops a continuous black/white video input signal from the bit patterns in the respective memories 14, 15. The video circuitry 17 generates a 454 line scan, each line being resolved into 576 points. The memories 14, 15 are double-ported, and the memory access speeds are sufficiently fast that read-and-write access by the processor 11 does not interfere with the read activity of video circuitry. Thus, the displayed image on either monitor can be modified essentially at processor speeds. In addition, bit-map images stored on the fast disk memory can be transferred directly to the video refresh memory using conventional computer interface hardware. In this fashion, the system can switch keyboard images in the order of 0.3 seconds.

The memory word addressing unit associated with the display hardware allows an automatic multiple-word incrementing mode, which is extremely convenient for displaying dot matrix characteris one at a time. The memory control 16 allows software controlled switching among the memories for the computer read-write operations.

While only the two aforementioned video displays are implemented in the current configuration, up to sixteen 256 K-bit memories can be addressed without requiring the normal memory extender unit, for example, on the PDP 11/40 itself, and without using any of the computer's own memory address space. Thus, the exemplary system can be augmented to support as many as eight separate user-stations, each having the desired two video displays. Alternately, extra memories might be used to provide grey scales or multi-color signals, or various combinations for a smaller number of users.

Figure 13:
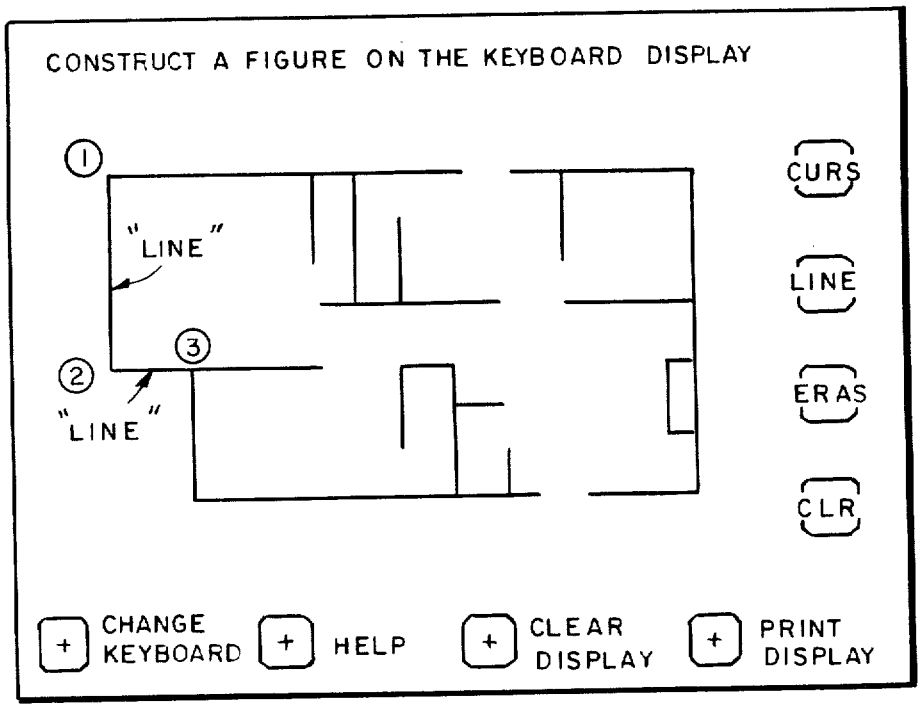

The third major component of the hardware is the keyboard display unit which includes overlay panel 18, with its associated scanning logic 19, discussed in connection with FIG. 2, and video display 13. The interface between such logic and the processor is standard and available from the processor manufacturer. In the case of a PDP 11/40 processor, for example, such interface is available as General Device Interface, DR11-C. The overlay panel 18 fits over the video display 13 which is oriented with its screen nearly horizontal, i.e., at a convenient angle for operator use. The display 13 and overlay panel 18 comprise the input key board. As disclosed, the overlay panel 18 is a cross-wire matrix, imbedded in plastic sheets. The user's finger pressure at a cross-point causes a contact to be made and, an identification by logic circuit 19 to processor 11 of the appropriate row and column coordinates for all cross-points which have been closed. In the processor 11, an identified crosspoint is checked against the stored list of the crosspoints associated with the "keys" on the currently displayed keyboard. If it is not a valid point (i.e., the crosspoint is not used on the current keyboard), it is ignored. If it is valid, a key-click signal is echoed-back, the appropriate working-symbol code associated with the valid "key" is thereupon accessed from the stored current keyboard description and checked against the complete stored symbol set to select the symbol description associated with such symbol code. The symbol description may include a pictorial representation of the selected symbol which will be thereupon presented to the appropriate location on the keyboard display monitor 12. When a cross-point not associated with a key is pressed, the terminal processor also stores information concerning such cross-point for possible use in connection with symbol related actions. An example, as shown in FIG. 13 discussed below, shows such cross-points being used in the construction of a drawing directly on the keyboard. When using the keyboard overlay for such graphical input, it is possible, using presently known expansion and "windowing" techniques, to expand the drawing being worked on to any resolution while providing a view of the unexpanded drawing (or a scaled down drawing) on the display monitor. Every keyboard includes space for an input display for displaying a line of symbols being input. This space is generally at the top of the keyboard. While symbols are displayed on the input line, they can be edited with the use of "built-in" driver subroutines.

The user station includes enclosed electromechanical circuitry performing the following functions: (1) providing the aforementioned audible click when a key is properly depressed; (2) providing a "buzzing" sound for indicating, for example, that an incorrect cross-point has been pressed; (3) providing a plurality of relays for actuating and controlling a variety of electrical devices which can be attached; (4) switching actions to allow the user to select a chord or non-chord operating mode, as discussed below. All of these latter devices are activated in response to symbol actions.

The size of the displayed keyboard is approximately 7"×10" and the vertical and horizontal wires are spaced ⅜" apart, forming a square-unit matrix array of wire cross-points; i.e., a 2-dimensional, ⅜" spacing of potentially live, touchable points, overlaying the displayed keyboard. Thus, in a present embodiment there are about 500 cross-points, the keyboard electronics being able to handle up to close to 1000 cross-points. However, not all of these need to be used for any one keyboard; indeed, it is possible to define a keyboard on which only one of the available cross-points is actually used.

The cross-point closest to the upper left-hand corner of the display is designated as row 1, column 1; i.e., cross-point (1,1). The cross-point row numbers increase as one moves vertically downward, and the column numbers increase toward the right; the cross-point at the lower right hand corner of the touch-wire mesh (or model I) is the 20,30 cross-point, i.e., column 30, row 20. The generalized cross-point is designated (i,J).

A number of the detailed features of the keyboard electronics deal specifically with "rolling" key contact (i.e., make-before-break typing), purposeful multiple key contact, and chording. A standard type of shift-key operation is used in which a shift-key is held down concurrently with another key. The logical shift keys are not limited to specific coordinates on the keyboard. This, in itself, requires the keyboard logic to handle more than one key being depressed at the same time. In addition, consideration of typing habits indicates that some users will find it natural to type a key before having necessarily released the previous one(s). Appropriate logical circuitry ensures that the processor is interrupted only when a new cross-point is pushed. The entire set of "on" points is then transmitted from the overlay electronics to the processor, and the new key is picked out (if more than one is on). The scan rates are sufficiently rapid that two sequentially typed keys will be resolved even with very fast finger motions.

The keyboard electronics can handle multi-key chords, a chord being defined as a condition in which a number of keys (from one to ten) are being pressed at the same time, much like the playing of a chord on a piano. The user, or a program, can select chord-mode operation, which causes the necessary change in the keyboard logical circuitry and informs the software of the mode change. In chord mode, separate chords are delineated by a total release of the keys; one side benefit of the keyboard logic in this mode is that the user can adjust his fingering of a chord, if the initial keys are not correct, as long as he does not fully release the keyboard until the right combination is achieved.

The keyboard logic and its operation will now be described with reference to FIGS. 2, 2A and 3 for scanning the keyboard to determine when the user has caused an input action to occur by touching one or more cross-points to cause closure thereof.

Figure 2:
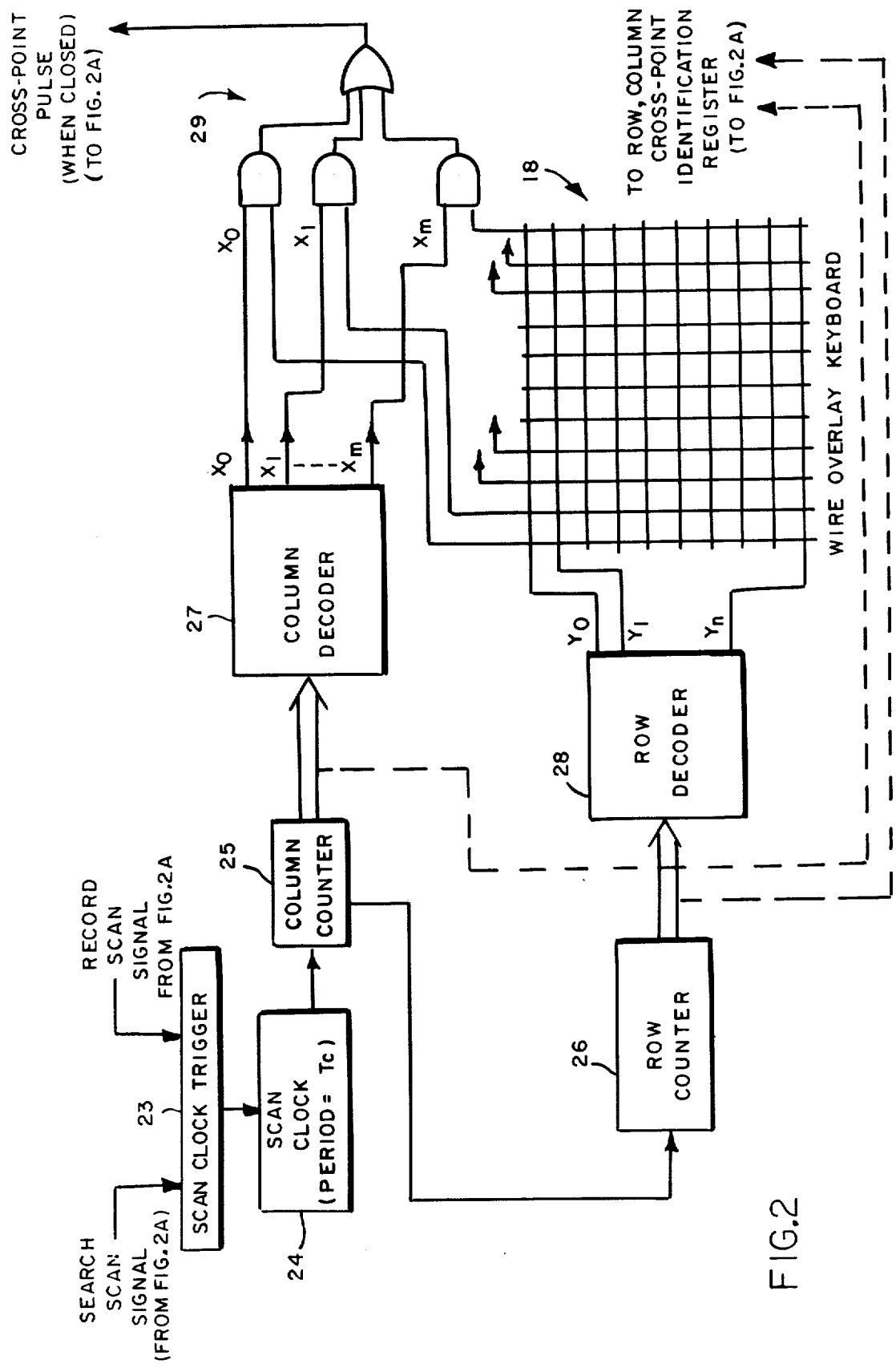
FIGS. 2 and 2A show in general a block diagram of the keyboard logic depicted in FIG. 1.
Figure 3:
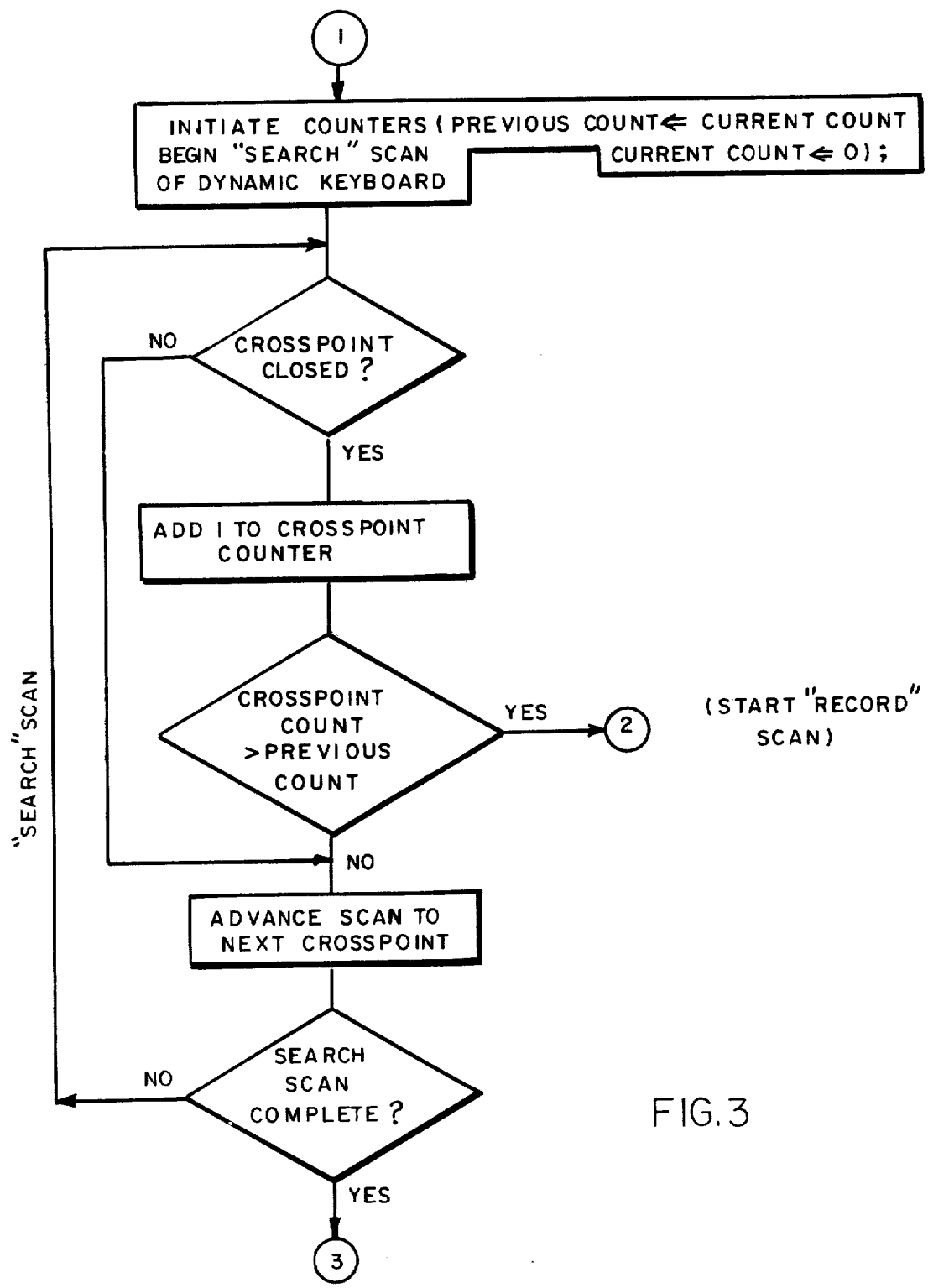
FIGS. 3, 3A and 3B contain an overall flow chart showing the operation of the keyboard logic of FIG. 2 in identifying cross-point closures at a keyboard display unit.

FIG. 2, for example, shows the cross-point overlay 18 connected to be scanned by logic which is wired to perform a sequential cross-point scan, i.e., to locate cross-points which have been depressed to cause contact between a horizontal wire and a vertical wire. The position of a given contact (i. j) is ascertained and used as an input to the system as will presently be described.

Figure 2A:
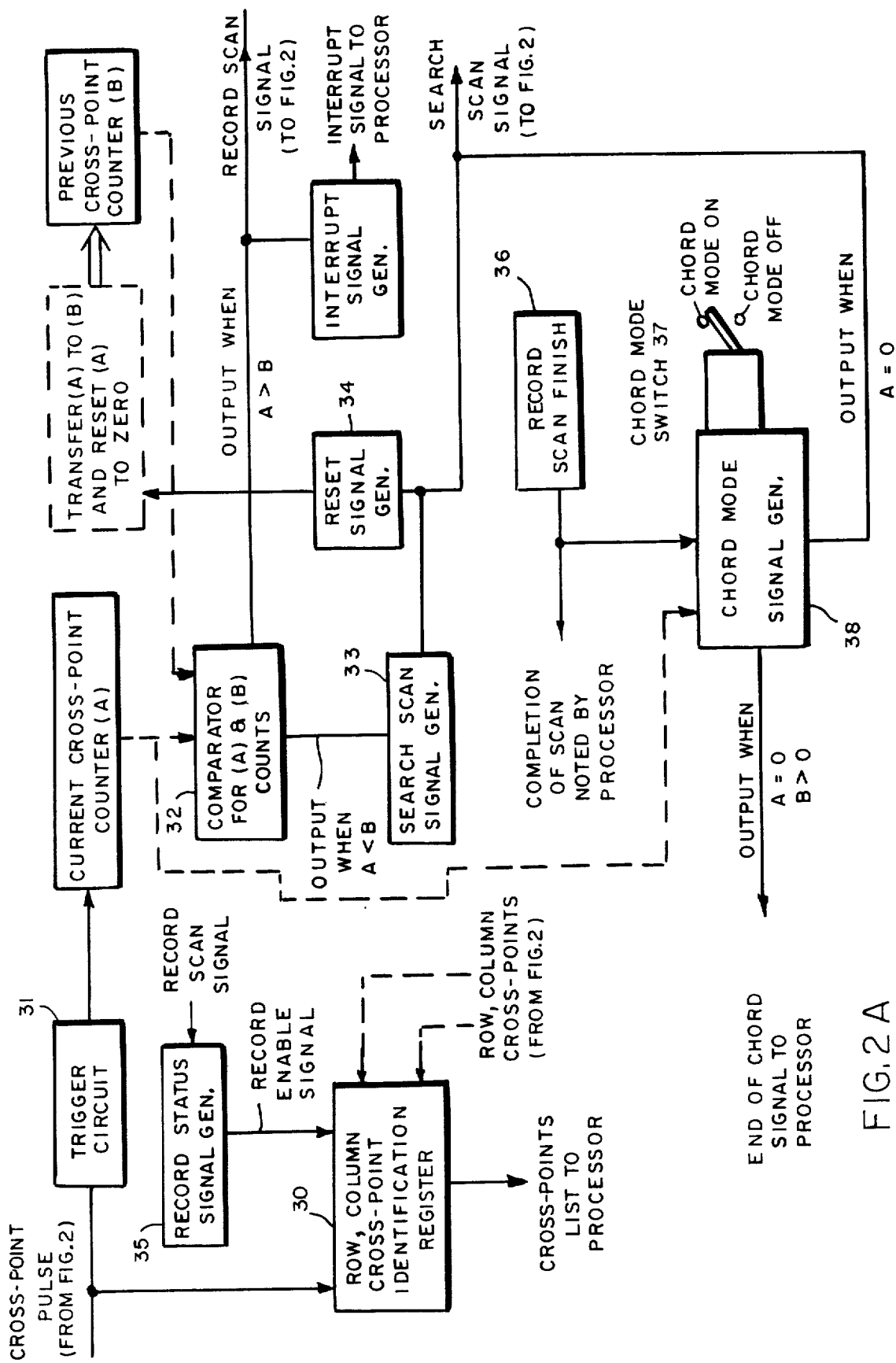

The scanning logic of FIGS. 2 and 2A operates in a "search" scan mode or a "record" scan mode. In the search mode the keyboard is scanned to determine whether or not a change has occurred in the number of cross-points which have been touched or depressed by the user since the previous scan. If the search scan determines that one or more new cross-points have been activated by the user the system then scans in its record mode so that the identification of the cross-points can be passed to the processor in order that the action desired by the user in touching the new cross-point can be achieved.

In such operation a search scan signal is supplied to a scan clock trigger 23 which triggers the scanning clock 24 having a clock period, for example, equal to $T_C$. The column and the rows of the overlay are sequentially scanned by means of column and row counter units 25 and 26 and column and row decoder units 27 and 28. When the scan indicates that a cross-point has been touched, or activated, and contact has been made between the vertical and horizontal wires, a cross-point pulse occurs at the output of the gating logic 29 associated therewith. The identifications of the cross-points being scanned are obtained from the column and row counters 25 and 26 for supply to a row, column cross-point identification buffer storage unit 30.

At the beginning of a search scan a current cross-point counter (A) is set to zero and each time a cross-point closure is identified by the scanning logic the cross-point pulse which results causes a trigger circuit 31 to add a count of "1" to counter (A). When all cross-points have been scanned, the output of counter (A is compared to the output of cross-point counter (B), the count of which equals the counts of a previous search scan. Comparator unit 32 compares the count in counters (A) and (B) at the end of each scan to determine whether any new (i.e., additional) cross-points have been activated by the user.

If the count in counter (A) is less than or equal to that in counter (B), no action is required and the comparator 32 activates the search scan signal generator 33 which triggers a reset signal generator 34 for resetting counter (A) to zero and for transferring the count therein to counter (B) for the next search scan comparison. If the count in counter (A) is greater than that in counter (B), the keyboard logic prepares for a "record" scan. The record scan operation is preceded by a delay to eliminate potential ambiguities due to "contact bounce". The indication that the user has activated one or more additional cross-points (indicated by the fact that counter (A) is greater than counter (B) provides a "record" scan signal which activates a record status signal generator 35 for listing during the next scan coded data identifying all of the cross-points which have been so touched by the user in cross-point identification buffer memory 30. Accordingly, during the "record" scan, data representing each closed cross-point is placed in register 30 for transferring to and storage in the processor. At the end of the record scan the processor notes the end of the scan (e.g., indicated by a 0,0 cross-point reading) which indicates that the list identifying the closed cross-points is complete, the complete list of closed cross-points thereby being stored in the processor memory.

Figure 3A:
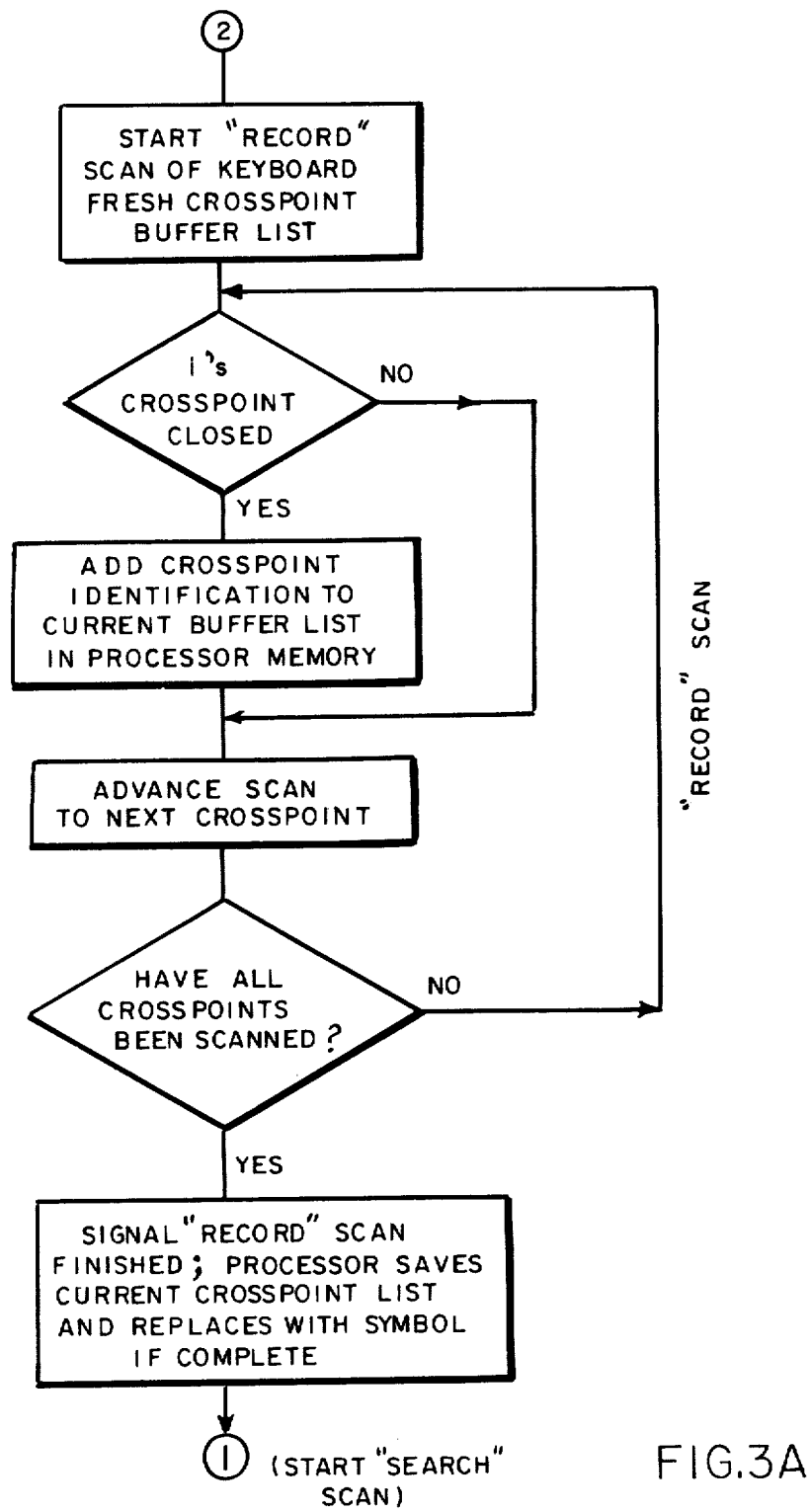

If the system is operated in a chord mode, i.e., the user desires to identify a symbol by the use of a simultaneous touching or depression of a plurality of cross-points, the system is placed into its chord mode of operation by an appropriate chord mode switch 37 activated either manually or by software control. A chord mode signal generator 38 provides a signal for continuing the "search" scan so long as the count in counter (A) is not equal to zero, i.e. so long as the user has made one or more key depressions. Once the user has settled on the selection of cross-points which form the desired chord he lifts his fingers off completely so that no cross-points are depressed. Such condition signifies the end of the chord selection and the chord mode signal generator provides an "end of chord" signal to the processor when the count in (A) is equal to zero and the count in (B) is greater than zero. Thus the keyboard logic as described in FIGS. 2 and 2A operates the scan sequence in the manner shown in the flow chart of FIG. 3, such sequence being performed as follows:

(1) A count of the number of cross-points indicated as closed during a "search" scan is saved in cross-point counter (B) and a new count thereof is obtained during the next search scan and stored in cross point counter (A);

(2) At the end of the next search scan, the current search scan count is compared to the search scan count from the previous scan in comparator 32. If the keyboard logic is not in a "Chord Mode" and the count is less than or equal to the previous count, the search scan is repeated;

(3) If the current search scan count is greater than the previous search scan count, a "record" scan of the keyboard is initiated, as shown in FIG. 3A. During the record scan, the row and column numbers for each closed cross-point are stored or passed directly to the processor so that the desired symbol description associated with the new closed cross-point can be accessed in the processor memory;

(4) When the record scan is complete, the processor notes that a complete list of closed cross-points has been transferred;

(5) The search scan is initiated again.

Figure 3B:
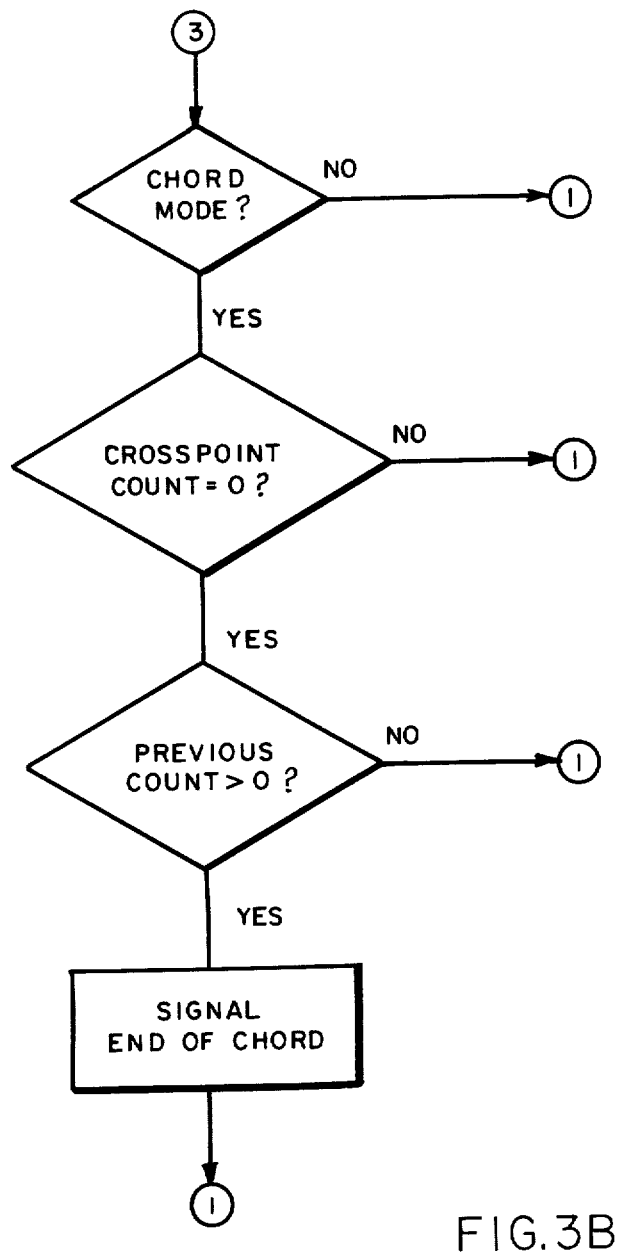

If the system is in its "chord mode" operation a signal signifying the "end of chord" is generated (FIG. 3B) when the scan shows a count of zero after a chord has been initiated (i.e., after all keys are lifted).

The video scan for the keyboard display 13 consists of 454 lines, and each line contains 576 resolvable points. (The spacings between horizontal scan lines and between resolvable dots on a line are both approximately 0.02"). Thus, the display matrix is an array of 454 by 576 equally-spaced dots. Each point in this display matrix is represented by one bit in the 256 K-bit refresh memory 15 (16K × 16 bit words) in which the pictorial representation of the current keyboard being displayed on monitor 13 is temporarily stored. When an item, or part of an item (e.g., a symbol image) is defined as a dotmatrix, the dots of the defined item will be displayed as an appropriately positioned bit-array in the display matrix of the entire keyboard 13. For graphical items defined more generally, e.g., in terms of vectors through arbitrary x, y points, the lines or curves in the item will be represented by dots in the display matrix which are closest to the true curve.

x, y coordinates are used in the Terminal Definition Language only in the vector and origin graphical operators. The x=0, y=0 point is at the lower left hand corner of the display. x values increase to the right and y values increase as one moves to the top of the display. The units of x and y are integers, corresponding to the resolvable spots in the display image; x ranges from 0 to 575 and y ranges from 0 to 453.

The position correspondence between the wire cross-points and x, y positions on the display is not precise. Therefore, one should not attempt to use keyboard-global vector graphics to draw items precisely positioned with respect to specific cross-points. For this reason the cross-point positions are themselves used as the origins for items which need to be precisely located near them, such as cross-point markers, key outlines, and key labels.

A person using the terminal does so with reference to a set of keyboard images and a working-symbol set. The latter defines all the symbols which are referred to in a given set of keyboard images. The tables in which the keyboard image set and the working symbol set are defined and described represent the heart of the data base upon which the software system operates. The steps required to define new symbols and new keyboard images will generally be done by "authors", i.e., by people who are creating new interactive computer environments to be used by others. It is for these people that the Terminal Definition Language, as described below, is provided. Normally, the end user will not have to know anything about the Terminal Definition Language, nor, for that matter, substantially any of the details described herein.

Figure 4:
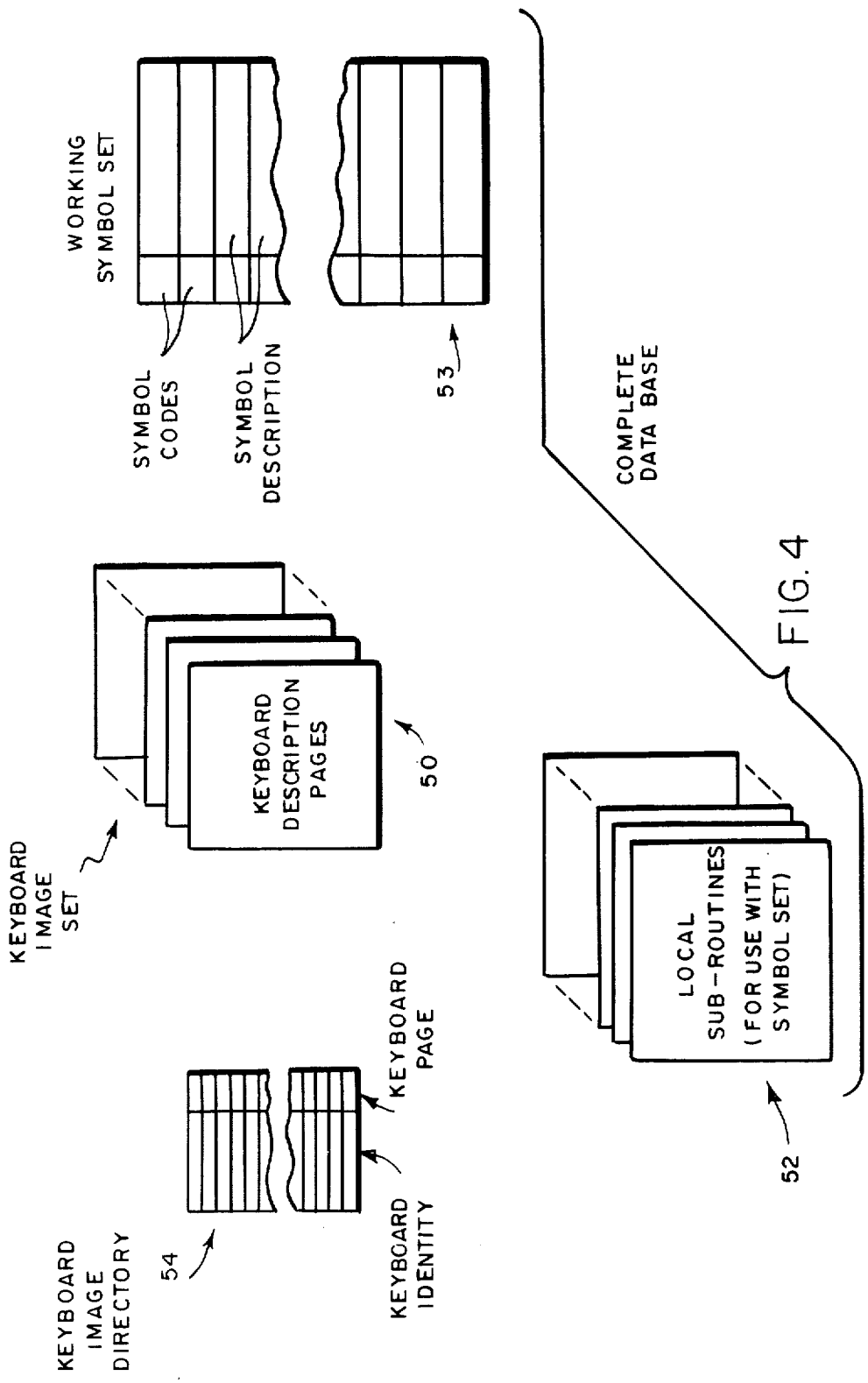
FIG. 4 is a diagrammatic representation of the overall data base used in the invention.

A diagrammatic representation of the complete data base is shown in FIG. 4. Such data base, for example, may be stored in a disk storage memory unit 21 which is made available to the processor so that portions thereof can be retrieved for storage within the internal core memory of the processor for current use at the higher speed of the processor itself. The data base includes a plurality of information pages, each one containing descriptions for drawing a specific keyboard image, as shown symbolically by the keyboard image set 50. The keyboard image set includes a keyboard directory 54 which identifies each keyboard and the page of the keyboard image set on which the stored information for drawing the keyboard is located. Further, the overall working symbol set 53 is also stored in the data base and includes a list of symbol codes associated with each of the symbols therein, as defined by the authors in the Terminal Definition Language discussed in more detail below. Each symbol code may have associated therewith the symbol description information mentioned above and discussed below with respect to the Terminal Definition Language which description information permits a pictorial representation of the particular working symbol involved to be displayed. In addition, each symbol code may have associated therewith some symbol action information also discussed below with respect to the Terminal Definition Language. A set (52) of subroutines is also stored in the data base, such subroutines being evoked by interpretation of the symbol definitions for performing actions, if appropriate, which are associated with the symbols in the working symbol set.

The software system starts with the facilities required for the "authors" to define their personal working-symbol sets and sets of keyboard images, and includes everything required to implement the Terminal Definition Language: the routines and subroutines necessary to handle locally all input from the keyboard, the display functions, local editing of input before transmission, and formulation of the input into a coded transmit stream, as well as output from a received stream of symbol codes.

A keyboard image description as shown is defined in terms of:

(A) An (optional) graphic/character-string combination (a "keyboard-global") not associated with any particular key and which can extend to any point on the keyboard display. This is useful for headings, legends, and instructions. In the exemplary keyboard of FIG. 11, discussed below, the "global" is "CHOOSE A DEMONSTRATION!".

Figure 11:
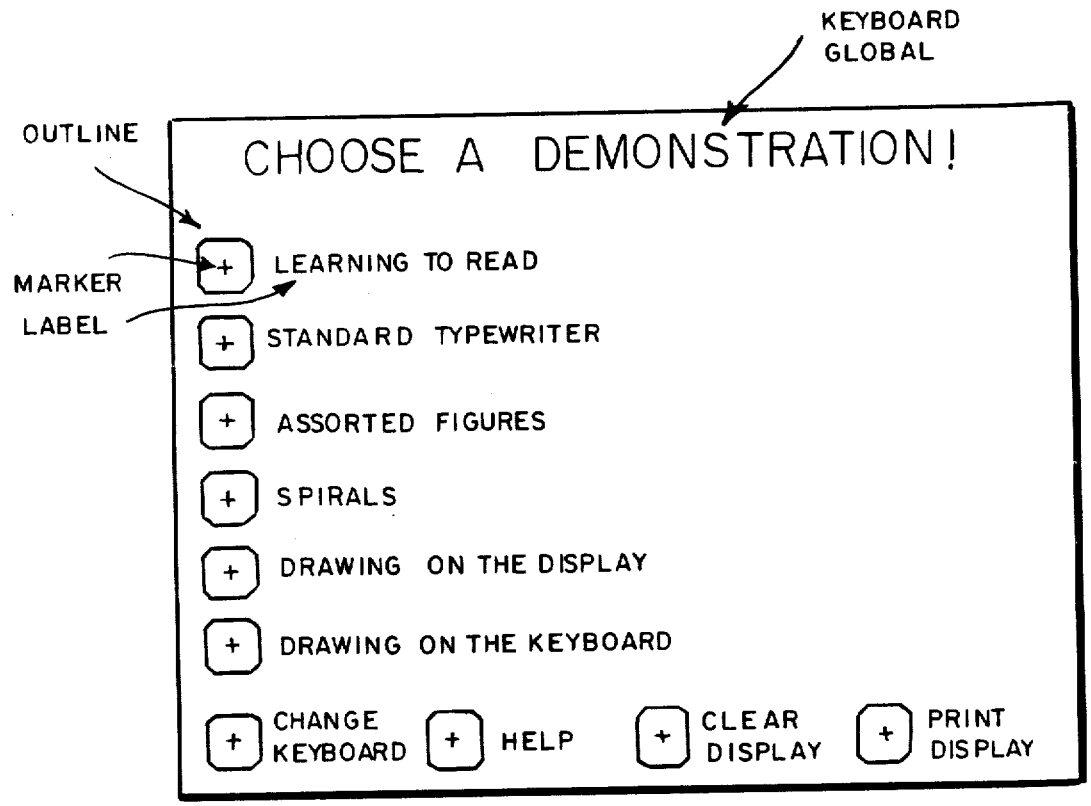
FIGS. 11-15 depict exemplary keyboards useful in explaining a typical operation which could occur in using the system of the invention.

(B) A table of all of the "keys" defined on the given keyboard. Each key on each keyboard is defined by a number of descriptions and attributes, of which the most important are the following:

1. The key location, in terms of the horizontal and vertical coordinates of the wire cross-points on the overlay which are contained within that key "button". A key needs to have only one cross-point but it can include many. Thus, in the keys shown in FIG. 11 a key includes a group of cross-points encompassed by the box outline associated therewith. The total of all of these cross-points for all of the specific keys defined on a given keyboard image are the "live" ones; all other points on the overlay are "dead" and pushing them has no effect.
2. A name, by which one can refer to the key.
3. The name(s) of the symbol(s) in the working symbol set which are associated with the given key. Because "SHIFT" keys can be defined, one key can refer to more than one symbol, depending on the current "shift" level. More than one key on a given keyboard can refer to the same symbol.
4. An (optional) key label. Key labels can be constructed from the same general elements used to define symbols (normally excepting operational "action" functions) and, indeed, the key label can be the visual aspect of the associated symbol itself, appropriately located. While each key must refer to one or more working symbols, keys need not have individual labels. In addition, key labels are not restricted with respect to their position relative to the key.
5. The name of a "marker", which is a graphic design by which each live cross-point within the key should be visually indicated (e.g., by a bright spot, a small bull's eye, a star, etc.). In FIG. 11, example, the marker for each key is a small "+" sign within the key outline.
6. The name of an "outline", which is a graphic used to outline the desired shape of the key button. In the example of FIG. 11, the outlines are octagonal boxes.

In addition to the predefined components, each keyboard can have dynamically variable elements:

1. A dynamically variable, keyboard-global, graphic/character-string header, like the predefined item as described above, but definable during the course of operation of user-level software.
2. A dynamically variable Key label for each key. System routines are provided which allow user-level programs to provide the necessary descriptions during their operation. For example, a routine to add a dynamic key label would have three parameters (arguments): the keyboard image name, the key name, and a description of the desired label.
3. A dynamically variable key status by which a key can be in an active, or "live" status or in an inactive, or "dead" status.

In practice, the first time a keyboard image is used in a given user process, the predefined portion will be generated from the keyboard definition, described above. A copy of the bit-map representation of that image, as recorded in the video refresh memory, can be stored in the disk memory and used for all later displays of the image. If dynamically variable elements are attached to the keyboard image, these are subsequently drawn out directly from the then current description.

THE SYMBOL SET

Each key in the entire set of keyboard images is associated with a symbol, (or up to four symbols corresponding to the four different "shift" levels that can be key-selected) and the entire set of symbols comprises the working-symbol set. The word "symbol" is used here in a fully generalized sense (as detailed below). There can be any number of symbols in the working-symbol set. The first 128 of these are always "predefined" to be the standard set of ASCII characters and controls.

A symbol may be defined in terms of any combination of the following general components:
1. A single character;
2. Character strings;
3. Graphics—constructed of vectors and matrices;
4. Sub-symbols—each of which can be constructed out of the same components as symbols, but which are intended to be used as common sub-elements of a number of symbols and not as complete symbols themselves;
5. Strings of defined symbols;
6. Operational control functions—these are, in effect, subroutine calls, affecting the operation of the terminal, the handling of preceding or following input, etc., and not necessarily associated with any specific pictorial symbolic image.

The pictorial representation of a symbol associated with a key on a keyboard image is distinct from the key label. The two can be identical, of course, but, on the other hand, a symbol does not even need to have any pictorial representation. A given symbol appears only once in the working symbol set, but it can be attached to as many keys on as many keyboard images as the author desires. A given symbol, typed in from any keyboard image, will always have the same effect in terms of the pictorial image displayed, the symbol-code inserted in the transmit stream, and the action caused in the terminal system.

In addition to its pictorial representation, every symbol is further designated by a number of other items and attributes:
1. A unique name, by which it is always referred to;
2. A unique binary-bit code, by which it is represented in the processor for any input or output stream or text file. Generally, there is no need for either end-users or authors to know these codes.
3. A flag which indicates whether the symbol should be transmitted immediately, or held, for examination and possible editing, until the current input line is ended. The same parameter is also used to indicate if the symbol is itself a "terminator", i.e., a symbol which is used to indicate the end of an input line.
4. A flag which indicates whether the given symbol should not be transmitted at all. A "non-transmittable" symbol is one which causes an action only at the terminal.

THE TERMINAL DEFINITION LANGUAGE

In order for a user to define his working-symbol and keyboard image sets, a Terminal Definition File is stored in the processor memory, which file is prepared in accordance with the Terminal Definition Language. Thus, the author's description of his working-symbol set and keyboard-image set, in the Terminal Definition Language provided, is presented to the system as a text file, which can be edited on-line during construction thereof. On completion of the symbol and keyboard definitions, a "compiler" is used to transform that input file into the appropriately organized data bases, as hereinafter described.

The statements described below comprise the Terminal Definition Language and are used to create Terminal Definition File (TDF). The Terminal Compiler uses the description given in the TDF to generate a file defining a keyboard-image-set and a working-symbol-set for a user-process. The Terminal Definition Language defined here is designed to be used for the system's hardware "keyboard" on which the visual image of the keyboard itself is dynamically displayed at the keyboard display unit the user "typing" being accomplished through the previously described array of row and column "cross-wire" touch points. The terminal has two operational modes, normal and chord; in the latter mode more than one key can be touched simultaneously and the combination (a chord) represents one symbol.

In normal mode, the system permits key "rolling", that is, a sequence of keys touched in a make-before-break fashion will be interpreted as separate keys in the proper sequence; at the same time a standard "shift" key operation is also supported in which the shift key changes the symbol associated with the standard key. Any key can be designated as a shift key and there can be any number of shift keys on a keyboard. The system provides for four shift levels.

The Terminal Definition Language is used to define the necessary items which need to be described for any particular application of the special terminal. However, the Language is designed so that it, itself, can also be used with only a standard, simple terminal (such as a type 33 teletypewriter).

The Terminal Definition Language contains two primary categories of statements: those which declare data items and those which are operators used to describe the appearance and (if applicable) the actions caused by the data items. The former are referred to as Declarations and the latter as Operators. Operator Statements immediately follow the Declaration Statements whose items they describe.

In addition to the Declaration and Description Statements, there are two control statements. One of these ("include") allows a previously constructed piece for a TDF, stored on the disk, to be automatically inserted into a TDF file being input. The other ("crosspoints") is used to move around keys on previously defined keyboards.

For documentation purposes, a fourth type of statement ("comment") can be used to insert comments.

| Summary Table of the Language Statements | | |
|---|---|---|
| There are eight Declarations (designated as D.1 through D.8). | | |
| | Keyword | Function |
| D. 1.} | workset | declare a working set |
| D. 2.} | keyboard | declare a keyboard |
| D. 3.} | key | declare a key (on the previously declared keyboard) |
| D. 4.} | chord | declare a chord (on the previously declared keyboard) |
| D. 5.} | marker | declare a marker for live cross-points |
| D. 6.} | outline | declare an outline for a key (which may include more than one cross-point) |
| D. 7.} | symbol | declare a symbol |
| D. 8.} | subsymbol | declare a subsymbol |

There are eight Operators (designated as 0.1 through 0.8).

Summary Table of the Language Statements -continued

There are eight Declarations (designated as D.1 through D.8).

| | Keyword | Function |
|---|---|---|
| O. 1.} | matrix | describe a dot matrix |
| O. 2.} | vector | describe a vector |
| O. 3.} | origin | establish-or change-the origin (which is used by the "vector" operator) |
| O. 4.} | string | evoke a sequence of symbols |
| O. 5.} | do | evoke a subsymbol |
| O. 6.} | call | evoke a special function |
| O. 7.} | token | marks the beginning of an alternate description of a symbol, which, for example, can be used on the current input line. |
| O. 8.} | data | use the concurrently prescribed parameters as arguments for a preceding, incompletely specified "call" operation. |

The token and data operators are used only in the description of symbols.

There are three Control statements (designated as C.1, C.2 and C.3).

| | Keyword | Function |
|---|---|---|
| [C.1] | include | insert into the TDF a file previously stored in the disk memory |
| [C.2] | crosspoints | move a block of already defined keys on the keyboard a specified distance |
| [C.3] | file | include subroutine as part of working set |

There is one Documentation statement (designated as D.1).

| | Keyword | Function |
|---|---|---|
| [D.1] | comment | place a remark in the TDF (ignored by the compiler) |

Syntax for Declarations
1. Each statement begins with a keyword which identifies the kind of item being declared.
2. The keyword is usually immediately followed by a name which may be used later to refer to the specific item being declared.
3. All of the additional parts of a statement follow the name and may occur in any order. The additional parts are often optional, and have either the form "keyword" or "keyword = expression," where "expression" is either a name, a number or a list.

Syntax for Operators
1. Each operator begins with a keyword identifying the kind of operator.
2. The operator statements also have secondary parts but with a variety of formats.

To create a Keyboard-Image Set, consisting of new symbols and keyboards, it is necessary to use the Terminal Definition Language to create a Terminal Definition File. A Terminal Definition File consists of a series of statements which may be typed into the computer through an ordinary interface. When input through an ordinary interface, all statements, whether Declarations, Operators, Comments, or Control statements must begin on a new line. A statement is terminated by a carriage return, except in the following instances.
1. A hyphen is typed as the last character on the line, to indicate continuation;
2. an "open" parenthetic expression continues onto the following line;
3. an "open" quotation continues onto the following line.

When a statement is continued beyond a line, the line should not be terminated in the middle of a word, since the processor will split that word into two.

As mentioned earlier, the operators which describe aspects of an item being declared immediately follow the declaration statement itself. A format which is not required but which greatly enhances subsequent readability, is to indent the operators with a single "TAB" on the typewriter.

A number of shorthand notations are used in this document later for commonly used items. These shorthands are defined as follows:

:= means

< > := an item is enclosed which will be, or has been defined

<#> := a sequence of digits (i.e. an integer)

<v> := a sequence of 8 or fewer characters, consisting of alphabetics, numbers, or the characters "$", "." or "."

<f> := a sequence of 6 or fewer characters which does not contain "$", ".", or ".", and which is therefore suitable for use as the first name part of a PDP-11 Disk Operating System filename, for example.

<name> := the name of an item, following the rules for a <v>

{A|B} := either A or B may be used

[ ] := the enclosed item is optional in the statement

Also, in the descriptions of statements which follow, when a name needs to be assigned to an item, it is referred to as <name>. When a previously assigned name is to be used to refere to an existing item it is referred to as a <v> in the description. Commas are used throughout the description of statements to indicate their separate parts. In nearly every case, however, the use of the commas is optional and they may be left out.

The symbol, subsymbol, marker and outline statements must be followed by operator statements which define the substance of the declared items.

The keyboard and key statements may be followed by graphical operators. These can describe a label for an entire keyboard or labels for individual keys.

The statements in a Terminal Definition File can be arranged in any order, except for the following restrictions:
1. The workset statement must be the first statement in the file.
2. Symbol, subsymbol, marker and outline statements must be immediately followed by the sequences of operator statements (matrix, string, vector, origin, do, call, token and data) which define those items.
3. A keyboard definition consists of a keyboard statement and subsequent key statements or chord statements. That is, key statements or chord statements define keys or chords for the keyboard declared in the preceding keyboard statement. Graphical operators immediately following the keyboard statement can be used to define visual aspects of the keyboard image not tied to any specific keys, such as headings, instructions, or pictures, i.e., for a keyboard-global graphic, or a keyboard label. Graphical operators following each key statement are used to define (optional) key labels. A keyboard definition is terminated either by the end of the TDF or by another keyboard statement.

Control and Documentation statements may occur anywhere in a Terminal Definition File:
1. The comment statement allows comments to be placed in the file. These statements are ignored by the compiler.
2. The include statement is a control statement to the compiler. It diverts the compiler input stream to another file on the disk. Processing subsequently continues in the TDF at the statement following the include statement after the "included" file is exhausted.
3. The crosspoints statement is a control statement to the compiler. It causes the compiler to move groups of keys on a keyboard to a new position.

The TDF may be written through a standard terminal and with the facilities of a standard operating system, as mentioned earlier. Then, the normal conventions for creating, editing, and naming a file are used. Since the present prototype terminal can function for example, with a DEC PDP-11/40 processor, the latter's disk operating system (DOS) can serve as an example. Using DOS, one writes files via the "editor". The author would type r edit The machine responds

If beginning a new TDF, the author then types the name desired for the new file, e.g.

<new.file.name>

If his intent is to modify or to continue work on an existing TDF, the author also gives the name of the existing file on which he wants to work, the two names being separated by a "less than" symbol, e.g., <new.file.name> < <old.file.name>

These two names will normally be identical, unless he wants to save the old file in its original form. The filename of the TDF is—in effect—the name of the working set (keyboards and symbols) which it defines, and is the name which the author will later use when he actuates it on the Enhanced Input Terminal.

The author then simply types in the rest of the desired working set description, writing a TDF in the Terminal Definition Language, defined in detail below.

DECLARATION STATEMENT DESCRIPTIONS workset[,height=<#>][,width=<#>], {D.1}

[rspace=<#>]

The workset declaration must be the first statement (except for comment statements) in the terminal definition file. The workset statement provides information about the size of symbols in the working symbol set when dot matrices are used to define the visual aspect of symbols. Although these numbers can be overridden in each individual instance, they do prescribe what the author considers to be the "normal" size for this working set.

- height=<#>: specifies the height (in display resolution units) that should be used as a default for the height of a matrix used in the definition of a graphical item if a different height is not specified in the matrix statement. If this item is not included in the workset statement a default value of 9 will be used.
- width=<#>: specifies the width (in display resolution units) that should be used as the width default for matrix statements. If this item is not included in the workset statement a default value of 7 will be used.
- rspace=<#>: specifies the number of columns (positive or negative) that should be left empty on the right side of a matrix after it is generated. The value given is used as a default for any matrix descriptions in which the optional rspace specification is omitted. If the space specification is omitted from the workset declaration itself, the value 0 will be used a a default.

keyboard<name>[,marker=<v>][,type=<#>]  {D.2}

The keyboard statement marks the beginning of the definition of a keyboard image.
- <name>:=a<v> which is used as the name of the declared keyboard image.
- marker=<v>:=the marker to be used by default for all keys on this keyboard, whenever a different marker is not explicitly specified in the statement for an individual key. If this item is not included in the keyboard statement, the keyboard default will be that cross-points have no markers.
- type=<#>:=specifies the physical hardware for which the current keyboard is being defined. This allows different mechanical devices to be used. The default for this item is the type of hardware described earlier in the present document, which is the preferred hardware that is used at present.

Key[<name>],cross-points=<c.list>,  {D.3}

[symbol=<s.list> |shift={1|2|3}]

[,marker=<v>][,outline=<v>]

[token][dead|alive]

A key statement declares and specifies the attributes of a single key on a specific keyboard. A key can include one or more live cross-points (as specified in <c.list>) and it is tied to one marker (which is used fo all of the listed cross-points) and to one (optional) outline. A key can either be
(a) tied to one, two, three, or four different symbols in the working symbol set, as specified in <s.list>, each one corresponding to one of the shift-key-controlled levels 1, 2, 3, or 4, or
(b) it may itself be a shift key, causing incremental level shifts upward of 1, 2 or 3.

If no marker is specified, the default marker declared in the preceding keyboard statement will be used. For each cross-point marker, the location of the cross-point will itself be used as the initial origin for the marker graphical description. The outline, if one is given, is drawn with the upper-left cross-point in the cross-point <c.list> as the origin for its graphical description.

The key statement may be followed by graphical operators which define a label for the key. The label, of course, can be simply the visual aspect of the symbol(s), suitably located. The upper-left cross-point in the cross-point <c.list> is also used as the origin for the graphical description of the label.
- <name>:=a <v> which is used as the optional name of a key. Note that in this particular instance, if the option to assign a name is not used, the "field" in the statement must be marked-off anyway (with a comma). If the user does not supply a name for a key, the compiler will generate a default name. The form of the default name is row.column where row and column are the coordinates of the upper left cross-point in the key. Keys are referred to by their names in chord statements; a name is also needed if the author plans to use certain of the possible dynamic changes that can be made to a key during the course of a user at the terminal. (See, for example, the description of the dead|alive option given below.)

<c.list>:=<element>[; <element>]...) where the list can include any number of elements, and <element>:=row, [-row$_2$], column$_1$[-column$_2$]

It should be noted that the commas between the row and column specifications of an <element> are required. In most other places in the language the indicated commas are not necessary, but can be used to separate the different parts of a statement. The semi-colons between each element is a <c.list> are required. Each <element> in the cross-point <c.list> can define:

(a) a single point (e.g., 17, 34)
(b) a part of a column (e.g., 5–22, 3)
(c) a part of a row (e.g., 8, 16–22)
(d) a rectangular group (e.g., 10–14, 9–31)

The "upper-left" cross-point in a group is the one with the smallest row number and smallest column number.

It should be noted that a cross point can be included in only one key.

It is worth emphasizing that in spite of the generality afforded by the cross-point <c.list> format, many keys will use only a single cross-point.

Many of the cross-points on the physical keyboard will not be "live" for a given keyboard image. Only those cross-points which are listed for these keys which are defined for a given keyboard will be live; all of the other cross-points will be "dead" and touching them will have no effect except through the use of special procedures (subroutines).

<s-list>:=([<v$_1$>][,<v$_2$>][,<v$_3$>][,<v$_4$>])

where: <v$_1$>, <v$_2$>, <v$_3$>, <v$_4$> are the names of symbols to be tied to the given key and associated respectively with shift levels 1, 2, 3 and 4 of the keyboard.

Only one symbol needs to be included, but if symbols are not specified for lower shift levels, the commas must be included to indicate which level the specified symbol(s) refer to.

Shift=(1|2|3):=the key being specified does not itself represent any symbol(s) but causes an incremental increase of the shift level by 1, 2, or 3 for symbol keys pressed at the same time as the shift key(s). If more than one shift key is pressed at the same time, the effective shift level increment is the sum of the indicated increments. The maximum level is four, however, so the maximum total shift level increment is 3. Note that a shift key is not the same as a shift-lock key (which is pressed only once, but which causes a change in the level for all subsequently pressed keys until it is pressed again). A shift-lock key can be defined by a symbol for which the definition is a special procedure call operation. For example:

symbol shift.flip.2, local call change.level.2 where "change.level.2" is presumed to be the name of a system-provided subroutine which "has the effect of" changing the shift level (up or down, as required) by 2, and "level" is a system variable. Such general utility subroutines are part of the terminal processor driver programs, while special purpose subroutines needed for specific working sets are part of the data base for that working set as shown in FIG. 4.

token=: an attribute which specifies that only the "token" portion of the symbol(s) which this key represents should be actuated at the terminal when the key is pressed. For a description of what this means, see the definition of the symbol statement, and the operator statements which are used to describe the visual and action aspects of symbols, especially the "token" operator.

dead|alive:=a choice for the initial (or basic) setting for one of the dynamically variable aspects of a key. If the choice "dead" is given, then the key will initially be totally absent from the keyboard—even though it is fully defined. If the choice is "live", the key will appear as described. The default is "live". During the course of a user session, keys can be turned on and off via software control (i.e., switched from the initial to the opposite choice, or vice-versa) using terminal actions. The choice given here, in the key specification, should be whichever state the author expects to be the more common one.

chord[<name>],keys=<list>,symbol=<v>    {D.4}

A chord statement declares that a group of simultaneously-pressed keys are to be used to represent a single symbol, when the keyboard has been put into "chord mode".

<name>:=a <v> which is used as the optional name of a chord. If the user does not supply a name, the compiler will generate a default name. The form of the default is ch.chars, where "chars" is the first 5 characters of the name of the symbol specified in the chord statement. The name of a chord is not referred to in any other statement in the language. It is included (as an option) only for the eventual purposes of specialized editing.

keys=<list>:=the names of the keys which comprise the chord, and

<list>:=(<name>[,<name>]...) where one to ten keys may be included.

symbol=<v>: the single symbol represented by the chord of keys.

Chords are meaningful to the terminal only when the keyboard hardware is in "chord mode". This may be done either by a user-controlled switch or by software control.

In chord mode the terminal will consider the entire group of keys being pressed at one time. It should be noted that since human finger motion time is slow compared to the keyboard sensing time, the concept of a group of keys being pressed or released "simultaneously" is not precise. The break between chords will be signalled whenever the typist totally releases the keyboard. In normal, "non-chord" mode, it is not essential for the typist to release one key before pressing another; that is, "rolling" is allowed and the terminal will generally be able to ascertain the desired sequence. The shift keys, of course, remain effective as long as they are pressed. Thus, once the fingering of a chord is begun, it can be readjusted, as long as the keyboard is not entirely released, and the effective chord will consist of those keys being pressed when the last one is pressed.

Generally speaking, it is to be expected that a single keyboard will be used either as a normal mode or a chord-mode keyboard. However, it is not illegal for one keyboard to be used in both normal and chord modes.

marker <name>   [D.5]

The marker statement declares a graphical data item which can be used to visually mark the location of a live crosspoint. A declared marker may be referenced in a key declaration or a keyboard declaration, as well as in special procedure calls.

<name> := <v>, used in the optional argument "marker=<v>" of a key statement, a keyboard statement, or a procedure call.

When a key uses only a single live cross-point (which may be a common case), the marker itself can serve as the key "outline", or vice versa.

The marker declaration must be followed immediately by the graphic operators which describe the marker appearance. The cross-point location itself serves as the origin for the marker graphic.

outline <name>   [D.6]

The outline statement declares an outline for a "key" shape. The outline statement is followed by graphical operators which define the outline. A TDF may include any number of different outline declarations. A declared outline may be referenced only by a key declaration or a procedure call.

<name> := a <v>, used in the optical argument "outline=<v>" of the key statement or a procedure call. When the graphic for an outline is drawn for a particular key, the location of the upper left cross-point in the cross-point list is used as the origin for the outline graphic. Thus, a given outline drawing will be appropriately located automatically for different keys on different keyboards without the author being directly concerned about the specific locations of the cross-points.

symbol <name>[, hold|immediate|terminate|   [D.7]

attention][, send[ = <list>]|send.receive=

<list> |local][, receive = <list>]

The symbol statement declares a working-set symbol. The Terminal Definition Language compiler assigns the next available binary code to the symbol.

<name> := a <v> which serves as the name of the symbol for the following purposes:
1. reference by a key declaration
2. reference by a string operator
3. reference in a procedure call
4. reference by an editor hold|immediate|terminate|attention. If "immediate" is specified, the symbol is transmitted as soon as the key is pushed, rather than being added to a line buffer and display and held for editing until an end-of-line character is typed. "hold" means keep the symbol in the buffer until the current line is finished, i.e., until a terminator symbol is typed. "terminate" means that this symbol is itself an end-of-line indicator. "attention" means much the same as "immediate", except that the terminal driver will make a special effort to process the symbol quickly, even at the expense of other work underway. The default is "hold".

The terminal holds the current input line for editing before sending the entire line. The end of a line is indicated by typing a terminator symbol, i.e., a symbol having the "terminate" attribute. Until a terminate symbol is typed, the line can be altered, but once the terminator is given the entire line is transmitted. During the typing-in process the visual representations of the symbols are "echoed-back" to the "input-display" line on the input panel so that they can be seen and used as a basis for editing.

send [ = <list>]|send. receive= <list> |local This choice first of all determines whether or not the code for the symbol is ever transmitted to a "host" computer. The "local" option says that it should not be; it is likely to be used for control-function symbols which only cause an operation at the terminal (e.g., change the keyboard image) and which are not intended to be part of the transmit-stream. "send" indicates that the symbol's code should be transmitted.

The "send" attribute may also be pressed with an argument list, as in send = <list>, where <list> is a list of one or more symbol names. If this is done, the string of symbol codes which represent the symbols in <list> is transmitted instead of the single code assigned to the symbol itself. If a symbol is to be represented by a substitute string of symbols on both input and output, this must be indicated by the option send- .receive= <list>. In output, if a string is to be recognized in this special sense, it must be enclosed between a pair of special "escape" characters which are not part of the <list> itself.

receive= <list> If the string of symbols specified by <list> is received as output from a "host" computer by the terminal driver, it is translated into the single symbol with which it is associated and that symbol is displayed, as in the "receive" part of the send.receive option described just above. Remember that on output, the <list> must be enclosed by the pair of "escape" characters.

The symbol statement should be followed by operators which define the visual appearance and actions, if any, of the symbol. Even if the symbol is not so defined, the symbol statement still serves to reserve a slot in the list of working set symbols; a symbol without a visual image will be represented as a solid, standard-sized matrix, if it is displayed.

subsymbol <name>   [D.8]

The subsymbol statement marks the beginning of the specification of a working-set subsymbol. It is followed by graphical operators which define the subsymbol.

<name> := a <v> which is the name used when the subsymbol is referred to as the argument of the do graphical operator.

Thus, a single subsymbol can be used as part of a great many symbols, while typing the graphical description only once.

2.8 Graphical and Action Operator Statement Descriptions

The following operators ("matrix", "vector", "origin", "string", "do", "call", "token", and "data") are used to describe the visual and/or action aspects of items defined in declaration statements. The operator—descriptions immediately follow the respective declaration statements in the working-set file. Each must start on a fresh line.

matrix [vertical=<#>]
[, rspace=<#>] [, width=<#>]
[, height=<#>], pattern=(<<row>>|,<<row>>]...)

A matrix operator is used to define a dot matrix character. A matrix is drawn relative to the current position of the cursor. The left-most bit of the bottom row of a matrix is at the cursor and "vertical" units above or below the cursor. After a matrix has been drawn, the new position of the cursor will be "width+rspace" units from its previous position in the original horizontal scan line.

vertical=<#>: The matrix is raised or lowered the specified number of scan lines. The matrix is lowered if <#> is negative and raised if it is positive. The range of values is from −31 to +31. If vertical is omitted, the default value is 0.

rspace=<#>: If the value of rspace is zero, the cursor will be left at the first column to the right of the matrix. If rspace is in the range 1 to 31, the cursor will be that many extra positions to the right. If rspace is in the range −1 to −31, the cursor will be moved back to the left by that many positions. If the rspace specification is omitted here the default established in the workset statement is used.

width=<#>: width gives the number of bits in each row of the matrix, exclusive of the rspace specification. The allowable value for width ranges from 1 to 255. If the width specification is omitted the default established by the workset statement is used.

height=<#>: height gives the number of rows in the matrix. The allowable value for height ranges from 1 to 255. If the height specification is omitted the default established by the workset statement is used.

pattern=(<<row>>[,<<row>>]...): Pattern gives the exact bit configuration of a matrix. The value assigned to pattern consists of a parenthetic expression containing as many <<row>> elements as the matrix has rows. Each <<row>> element consists of a left and right angle bracket with at most as many characters between the brackets as there are bits in a row of the matrix. A blank character is interpreted as an off bit and a non-blank character as an on bit. The sense of the entire displayed image, in terms of what is dark and what is light, can be controlled by a subroutine call, either bright print on a dark field or dark print on a bright field.

Each row element of a matrix pattern may be typed on a separate line, one under another, so as to stimulate the matrix configuration being defined.
For example:

```
matrix pattern = (
  < >
  <.....>
  <. >
  <. >
  <.  ...>
  <.  . >
```

```
  <.....>)
``` vector x, y, <type> [, x, y, <type>]...            {0.2}

The vector operator consists of a sequence of one or more triplets of the form x, y, <type>.

x, y:=horizontal and vertical positions relative to the origin type:=either a keyword (see below) or a parenthetic expression of the form (n₁, n₂)

| "type" keywords | operation |
|---|---|
| position | move the cursor to x, y without writing |
| line | draw a solid line from the current cursor position to x, y |
| dotted | draw a dotted line from the current cursor position to x, y |
| dashed | draw a dashed line from the current cursor position to x, y |

$(n_1, n_2)$:=sequence of $n_1$ solid units followed by $n_2$ blank units. For example:
$n_1 = n_2 = 0$: position cursor
$n_1 \geq 1, n_2 = 0$: draw a solid line
$n_1 = 1, n_2 = 3$: draw a dotted line
$n_1 = 5, n_2 = 2$: draw a dashed line Origin [location={(x,y)|cursor}]            {0.3}

[, mode={fixed|floating}]

The origin operator is used both to set the current position of the origin and to determine the dynamics of how the origin changes. The origin is used as a reference point by the vector operator.

location=(x,y):=the origin is set at location x, y relative to the lower left corner of the screen.

location=cursor:=the origin is set to the current position of the cursor.

mode=fixed:=the origin will remain at its current position, except for the following situations:
1. If a subsymbol is evoked by a "do" operator, the old value of the origin will be saved and the origin will temporarily assume the value of the cursor. The origin will revert to its previous value after the subsymbol is drawn.
2. The origin is set to a new position with the "origin" statement itself.

mode=floating:=the current position of the cursor will always be used as the value of the origin.

The two subparts of the origin statement are both optional, so the statement can be used to set either—pr both—of the parameters "location and mode". The origin statement can be used as often as desired—even many times within the description of one traphical item. At the other extreme, it need never be used at all; unless otherwise specified, the default values "location=0,0" (i.e., the lower-left hand corner) and "mode=fixed" will be used. It should be recalled also that for the marker, outline and label descriptions tied to keys, the location of the upper left cross-point in the key's c-list is used as the origin.

string{<list>|'text'}            {0.4}

The string operator evokes a series of one or more working set symbols.

<list>:=(<v>[,<v>].....)

where:
- <v> is the name of any symbol in the working-set and the list can contain any number of names.
- <text>:=any text, i.e., a string of symbols, typed exactly as it should appear in the item being described. Use of this latter option requires that the actual symbols being referred to are themselves already available on the input device. These two options show in sharp contrast, therefore, the difference between a symbol itself and the name of the symbol.

do<name> {0.5}

The subsymbol operator "do" evokes the subsymbol with the given name. This evocation is done via a subsymbol table attached to the working symbol set.

<name>:=a<v> which is the name of a subsymbol

Note that a subsymbol definition can include any number of subsymbols, but not itself.

call<fname>[,<#>][,procedure=<fname>] {0.6}

[symbol=<list>][,subsymbol=<v>][,keyboard-=<v>]

[,key=(<v>,<v>)][,marker=<v>][,outline=<v>]

The call operator causes a temporary transfer of control to a machine language routine which is external to the Terminal Definition Language.

<fname>:=the name of the external procedure. The form of the name is subject to the same restrictions as an <f> name, except that it may contain "." and "$".

A procedure may contain up to 255 of the following kinds of arguments:
- <#>:=a decimal integer in the range ±32767.
- procedure=<fname>:=specifies the name of a procedure as an argument for a procedure call within the primary procedure being called.
- symbol=<list>:=specifies the names of a list of symbols as an argument; where
  <list>:=<v> or (<v>$_1$[,<v>$_2$].....)
- subsymbol=<v>:specifies a subsymbol name as an argument
- keyboard=<v>:=specifies a keyboard name as an argument
- key=(<v>,<v>):=specifies a specific key as an argument, using the full key identifier, consisting of the keyboard name followed by the key name.
- marker=<v>:=specifies a marker as an argument, where <v> represents the name of the marker.
- outline=<v>:=specifies an outline as an argument, where <v> represents the name of the outline.

For procedures that operate on components of an existing working set, the programmer requires detailed access to the data structures of the terminal system. Necessary information is available in system documentation. Of course, while authors may use procedures developed by systems programmers, regarding them essentially as parts of the terminal repertoire, few will be concerned with the actual writing of procedure programs. Thus, the "call" operator is simply a means of calling for a procedure to be executed, given a description of the name of the procedure and the type and order of arguments which the procedure expects.

token {0.7}

The "token" operator serves as a delimiter in the sequence of operators which follow a symbol declaration and which constitute the visual and action definition of that symbol. The token operator marks the end of the primary definition of the symbol and the beginning of the definition of a token representation for that symbol. The token representation is a visual representation of a symbol which is appropriate for inclusion on the current keyboard-input display line. That is, it is a reasonable size and does not contain procedure calls which, if accidentally performed, could not be "erased".

In conjunction with the description of the "terminate" attribute of the "symbol" statement {D.7}, the behavior of the terminal with respect to display and editing of the current input line was explained. The "token" operator serves in that context when the true visual aspects of symbols are inconvenient for such reviewing or when the symbol includes local actions (i.e. call operators) which cannot be cancelled on editing.

The "token" operator is meaningful only in the description of symbols {D.7} and subsymbols {D.8}, not for markers, outlines, key labels, keyboard globals, etc.

data <arg-list>
- <arg-list>=: one or more arguments to be used with an incomplete call statement from a previous symbol. (See the description of argument list under the call operator, {0.5}; the argument list definition is identical here.)

The data operator allows data to be defined as part of the definition of a symbol which can be used, for example, by the driver or by a subroutine initiated via a preceding symbol in the current input or output line. It can be used as a mechanism to allow the inputting of a local procedure call action and its arguments with a number of keys, rather than with one key. For example, suppose we desire the action evoked by call <sub.name> and that two arguments are needed, a keyboard name and a symbol name. Suppose that there is a choice of three keyboards that might be referred to, and 5 symbols. Thus, if we were to have a separate key for each possible combination (e.g., call sub.name keyboard=kname$_1$, symbol=s;
call sub.name keyboard=kname$_2$, symbol=s
etc.)

Fifteen different keys would be required, standing for 15 different symbols, each of which would include in its description one of the complete call statements, including two arguments. Alternately, the keyboard in use can be formatted such that one key is used for the "call" itself, three for the possible keyboards, and five for the possible symbol argument. This requires only 9 keys instead of fifteen. The savings in symbols and keys increases rapidly with the number of arguments and the choices for each.

Each data operator can be used to specify one or more arguments for a preceding call. Subroutines used in this fashion must themselves take responsibility for picking up the necessary arguments from the following symbol descriptions, using a system procedure provided for the purpose. Like the "token" operator, the "data"

operator is meaningful only in symbol and subsymbol definitions, not in markers, outlines, key labels, etc.

It should also be clear that convenient use of the "data" operator will often be made in conjunction with the "token" operator, with its inherent delay regarding execution until an entire input line is complete.

Documentation and Control Statement Descriptions comment <string>           {D.1}

The comment statement is ignored by the compiler. It is intended as a convenience for documentation purposes.
  <string>:=Any ASCII string include <filename>[prefix=<v>]     {C.1}

The include statement directs the input stream to the specified file prestored in the disk memory. When an End of File is encountered in the "included" file, processing continues in the TDF at the statement following the include statement. Files may be nested to a depth of three.
  <filename>:=a DOS filename (for example), which has the following typical form when the file resides on the system disk:
  [.ext |probno, progno]
where
  ext:=three or fewer letters,
  progno and progno:=numbers between 1 and 255, assigned to the person who created the file being referenced. If they are not included in this statement, the user's current values will be assumed.
  prefix=<v>:=<v> is to be added, as a prefix, to the names of all of the symbols which are defined in the file being included, thereby changing their names. This portion of the include statement is useful, for example, when a TDF is being constructed from a number of pre-existing files with different forms (or fonts) of the same characters. It is possible that the same names would have been used for given characters even though the visual appearances were somewhat different. This would ordinarily preclude their being combined into one TDF (where each symbol needs to have a different name), but the "prefix" option obviates that difficulty.

crosspoint [row=<#>][col=<#>]     {C.2}

The "crosspoint" statement specifies values to be added (or subtracted if the values are negative) to the row and column number of the cross-points associated with subsequent keys. The "corrections" are made to all key declarations which follow within a given keyboard definition, up to the next "keyboard" statement or another "crosspoint" statement. The default values for both the row and column parameters are zero.

Insertion of "crosspoint" statements in a TDF makes it easy for an author to shift groups of keys around on already defined keyboards, while changing none of the existing individual specifications.

file <filename>[,<filename>]      [C.3]

The "file" statement specifies the names of modules which contain the subroutines which are invoked by call operators in the working set which is currently being defined. The driver automatically links to the subroutines in the named files, when such working set is used. Thus, the special subroutines are effectively part of the data base of the author's working set and all such subroutines need not be part of the common driver.

---

Summary Reference Table of the Statement Descriptions

{D.1} workset [height = <#>][width = <#>][rspace = <#>]
{D.2} keyboard <name> [marker = <v>[]type = <#>]
{D.3} key [<name>|,] cross-points = <c_list>
 {symbols = <s_list> |shift = {1|2|3}} [marker = <v>]
 [outline = <v>]
{D.4} chord [<name>] keys = <list> symbol = <v>
{D.5} marker <name>
{D.6} outline <name>
{D.7} symbol <name> [hold|immediate|terminate|attention]
 [send [= <list> ]|send.receive = <list>|local]
 [receive = <list> ]
{D.8} subsymbol <name>
{O.1} matrix [vertical] = <#>][rspace = <#>]
 [width = <#>][height = <#>]
 pattern = (<<row>><<row>>...)
{O.2} vector x y <type> [x y <type>]........
{O.3} origin [mode = {fixed|floating}]
 [location = {(x, y)|cursor}]
{O.4} string {<list> |'<text>'}
{O.5} do <v>
{O.6} call <fname> [#][procedure = <fname>]
 [symbol = <list>]
 [subsymbol = <v>][keyboard = <v>]
 [key = (<v>, <v>)][marker = <v>]
 [outline = <v>]
{O.7} token
{O.8} data [<#>][procedure = <fname>][symbol = <list>]
 [subsymbol = <v>][keyboard = <v>]
 [key = (<v>, <v>)][marker = <v>]
 [outline = <v>]
{D.1} Comment ASCII
{C.1} include {filename}
{C.2} crosspoint [row = <#>][col = <#>]
{C.3} file [filename]
In connection with the above summary, the following definitions apply:
<c_list>: = (<element>[;<element>]...)
where element : = row$_1$ [−row$_2$], column$_1$ [−column$_2$]
<s_list>: = [<v>$_1$] [<v>$_2$] [<v>$_3$] [<v>$_4$]
<list>: = (<v> [<v>]...)
<type>: = {<keyword>|(n$_1$, n$_2$)}
 (where n$_1$ and n$_2$ give the relative
 lengths of solid and blank sections,
 respectively)

---

ABBREVIATIONS

Each of the keywords in the language, including the secondary level keywords which are used as subparts of the primary statements, may be abbreviated to two characters. In every case, the two characters are the leading characters of the word, except in the instances which would be ambiguous:
 key and keys→ky
 keyboard→kb
 marker→mr
 matrix→mt
 send→se
 send.receive→sr
The keywords and their minimal abbreviations are listed in the table headed "Keyboard Abbreviations" below. For this purpose, the keywords are divided into two classes, primary and secondary. Keywords in the primary class all begin statements (which must start on a new line). Secondary keywords are the (sometimes optional) parts of statements.

KEYWORD ABBREVIATIONS

| Primary Keywords | | Secondary Keywords | | | | |
|---|---|---|---|---|---|---|
| chord | ch | chord | | call, data | | include |
| key | ky | keys | ky | key | ky | |
| keyboard | kb | symbol | sy | keyboard | kb | prefix pr |
| marker | mr | | | marker | mr | |
| outline | ou | key | | procedure | pr | |
| subsymbol | su | cross-points | cr | outline | ou | |
| symbol | sy | marker | mr | subsymbol | su | |
| workset | wo | outline | ou | symbol | sy | crosspoint |
| call | ca | shift | sh | matrix | | row ro |
| data | da | symbol | sy | height | he | col co |
| do | do | | | pattern | pa | |
| matrix | mt | keyboard | | rspace | rs | |
| origin | or | marker | mr | vertical | ve | |
| string | st | type | ty | | | |
| token | to | | | origin | | |
| vector | ve | symbol | | location | lo | |
| comment | co | attention | at | mode | mo | |
| crosspoint | cr | hold | ho | | | |
| include | in | immediate | im | vector | | |
| file | fi | local | lo | dashed | da | |
| | | receive | re | dotted | do | |
| | | send | se | line | li | |
| | | send.receive | sr | position | po | |
| | | terminate | te | | | |

Software for the terminal mainly consists of two main programs, the Terminal Definition Language Compiler and the Terminal Driver.

The compiler accepts, as input, statements written in the Terminal Definition Language. From these statements, the compiler produces the working symbol set, the set of keyboard images, and the keyboard image directory.

The driver controls the terminal according to the specifications found in the data produced by the compiler. The driver uses this data to respond to symbol codes sent by a user program and key pushes generated by a user.

THE TDL COMPILER

Once a Terminal Definition File written in Terminal Definition Language is completed in accordance with the author's desired working-symbol set and keyboard images, the compiler converts the Terminal Definition File data into the organized data bases as follows:

The Terminal Definition Language Compiler uses the Terminal Definition Language statements that it finds in a Terminal Definition File to create a Working-Symbol Set, a set of Keyboard Images and a Keyboard Directory organized as shown in FIG. 4.

The Working Symbol Set includes (a) A Symbol Attribute List which contains a word for each symbol. Each word contains bit settings which denote attributes of the corresponding symbol. The words are ordered so that the $k^{th}$ word applies to the symbol with a code k.

(b) A Symbol Pointer List which contains a pointer for each symbol, ordered so that the $k^{th}$ pointer applies to the symbol with a code of k. Each pointer points to a sequence of instructions located in the Working-Symbol Set Extension which, together with the entry on the Symbol Attribute List, constitutes a definition of the symbol.

(c) A Working Symbol Set Extension which is a collection of instruction sequences which are used to define the symbols of the Working Symbol Set.

Each Keyboard Image Description includes (a) A Cross-point List: a list which contains an entry for each cross-point which is used by the keyboard image.
An entry contains:
1. the row and column number of the cross-point to which the entry applies, including any shift-level modification,
2. the symbol code of the symbol which is activated by touching the cross-point,
3. pointers to instruction sequences located in the keyboard extension. These instruction sequences define the appearance of the key of which the cross-point is a part.

(b) A Keyboard Image Extension which is a collection of instruction sequences which are used to describe a keyboard.

The Keyboard Image Set includes (a) A keyboard directory, giving the location of each keyboard image in the set. Thus, the keyboard directory contains an entry for each keyboard defined in the Terminal Definition File. An entry specifies the location of the corresponding keyboard image.

(b) A series of keyboard images which comprise the set.

As a help in understanding the system the following example shows a Translation of Terminal Definition Language Statements into a data structure known as a Working-Symbol Set:
The following two statements define a symbol:
SYMBOL CHANGE.KEYBOARD LOCAL
CALL CHKB KEYBOARD=NEXT.KB
The compiler would take the following actions in response to statements such as the above:

1. An attribute word is added to the Symbol Attribute List for the symbol named "CHANGE.KEYBOARD".
2. The instruction CALL(with its argument) is binary-encoded and added to the Working Symbol Set Extension.
3. A pointer is added to the Symbol Pointer List which points to the encoded CALL instruction.
4. The appropriate bits in the attribute word are set to the code for "LOCAL".

The following example shows a translation of Terminal Definition Language statements by the compiler into a data structure known as a Keyboard Image:

The following three statements define a keyboard with one key:
KEYBOARD SIMPLE
KEY CHANGE CROSS-POINTS=(6,7) OUTLINE=SQUARE—MARKER=STAR SYMBOL=CHANGE.KEYBOARD
STRING 'PUSH THIS KEY'

A series of statements such as the above would cause the Compiler to take the following kinds of actions:
1. In response to the KEYBOARD statement the compiler would add an entry in the Keyboard Directory and would set up the framework for a data structure known as a Keyboard Image for the new keyboard "SIMPLE".
2. In response to the KEY statement, the compiler would make two additions to the newly set-up Keyboard Image:
   a. The instruction STRING would be binary encoded and added to Keyboard Image Extension.
3. A cross-point entry would be added to the cross-point list and the following data would be stored in the entry:
   a. The CROSS-POINT coordinates 6, 7.
   b. The symbol code for the symbol named CHANGE.KEYBOARD.
   c. Pointers to the OUTLINE, MARKER and LABEL associated with the key.

The Terminal Driver is a program which controls the operations of the terminal according to the specifications that it finds in a Working Symbol Set and the current Keyboard Image. The Driver performs two major control functions:
1. The processing of a key pushed by the user. When cross-point coordinates are sent to the Driver by the keyboard logic, the Driver uses the Cross-point List in the current Keyboard Image to translate the coordinates into a symbol code. The symbol code is added to an input buffer from which it is transmitted, when a "terminate" symbol is input. The Driver displays the symbol specified by the code by interpreting the instructions which define the symbol in the Working Symbol Set. Such processing is described in more detail below with reference to FIGS. 5-7.
2. The changing of a keyboard. When a request for a new keyboard is sent to the driver via a symbol with that action, either from the keyboard or from an external processor, the keyboard is displayed by the Driver by a process of interpreting the instructions which define it in the Keyboard Image Set. Such processing is described in more detail with reference to FIGS. 8-10.

Figure 5:
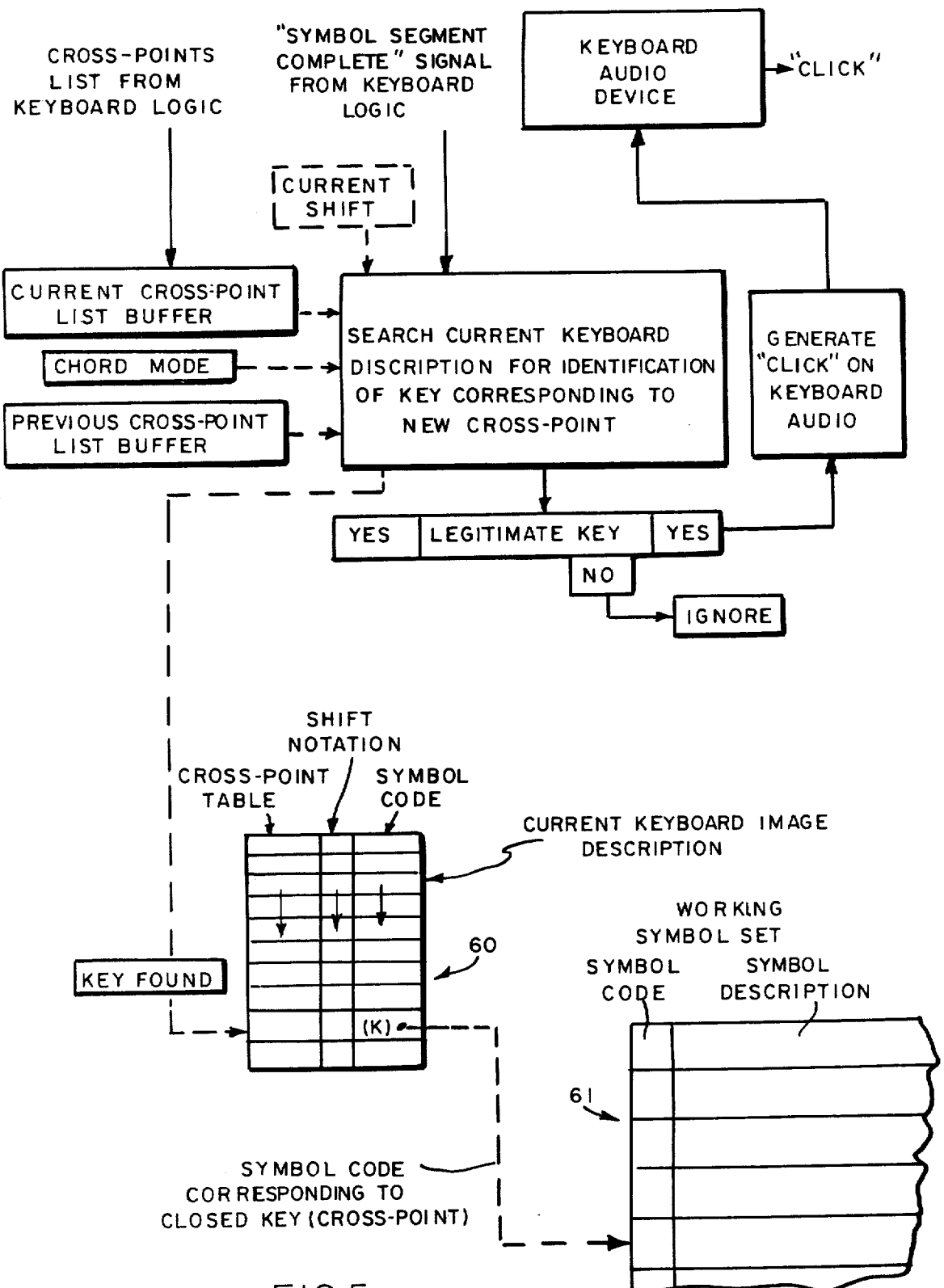
FIG. 5 is a diagrammatic representation of the operation required to identify a symbol and to acquire a symbol description associated with a cross-point selected by a user.

The cross-points lists supplied to the processor from the keyboard logic are utilized to select the appropriate symbol codes associated with the keys which have been activated, as shown with reference to FIG. 5. As can be seen therein, a list of the current cross points is stored in an appropriate buffer storage element. Accordingly, when the record scan is completed, the identity of all activated cross-points is made available to the processor so that they can be utilized to search the current keyboard image description to determine the symbol code which is associated with the newly pressed cross point. The current keyboard image description, part of the working-set data base, will have earlier been appropriately accessed and stored in the processor internal memory. The information in such description includes a sequence of all active, or live, cross-point numbers, a shift notation if necessary, and the symbol codes associated with each of the live cross point numbers. For cross points which are not associated with keys on the current keyboard image no action is taken unless such cross point is to be used as data for an ongoing action, such as for a graphical input, as in FIG. 13.

With the current keyboard image description stored in the processor memory, the pressed key(s) on the displayed keyboard image identifies the cross-point(s) thereof, thereupon actuating a search of the cross-points on the current keyboard image description until the appropriate symbol associated with the pressed key is found. The symbol codes associated with the pressed key is thereupon utilized to identify the symbol description associated therewith in the current working-symbol set, also stored in the processor rapid memory.

Figure 6:
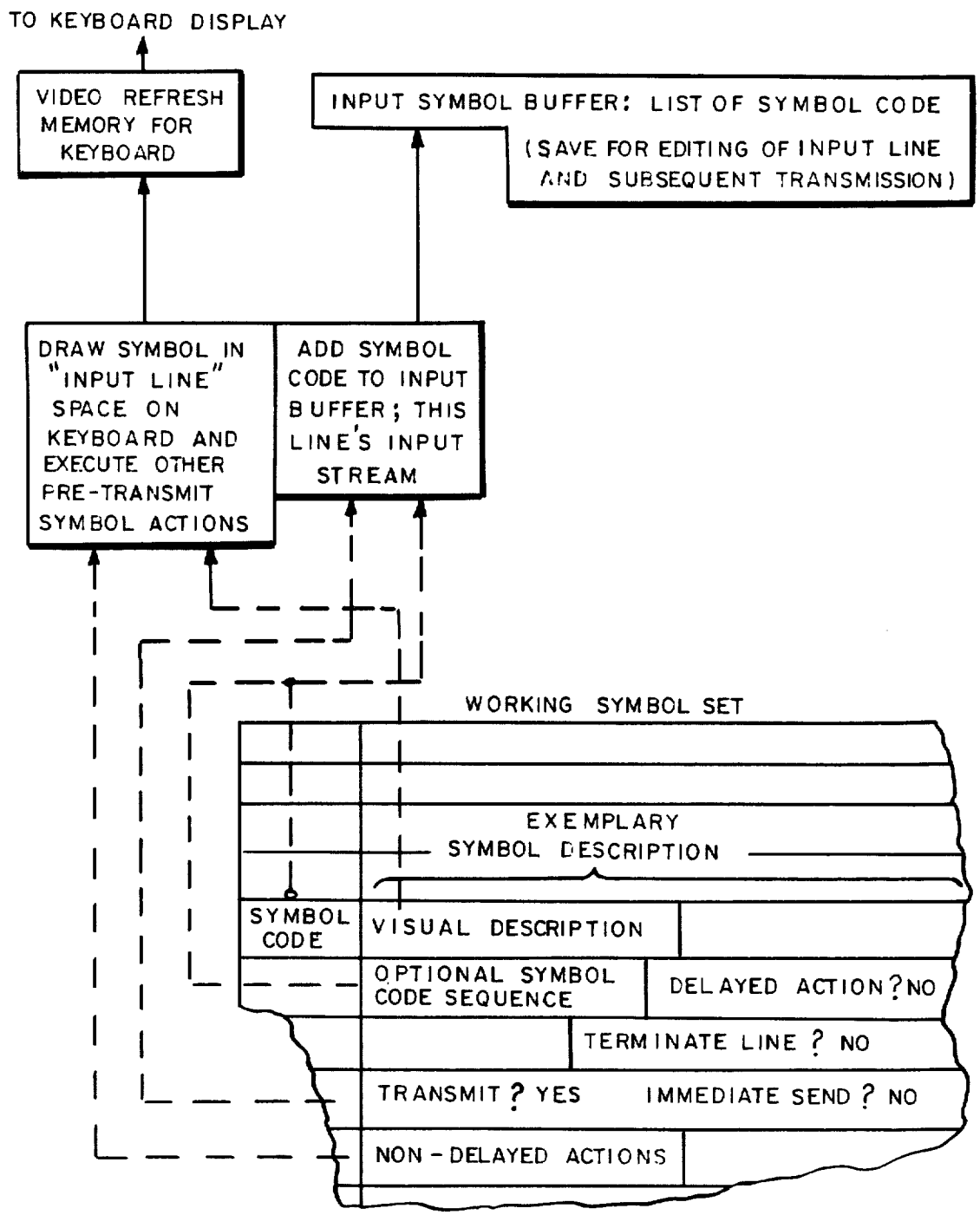
FIGS. 6 and 7 are diagrammatic representations of the operations required to display the visual appearance and to perform an action associated with symbols selected by a user and to transmit their symbol codes when required.
Figure 7:
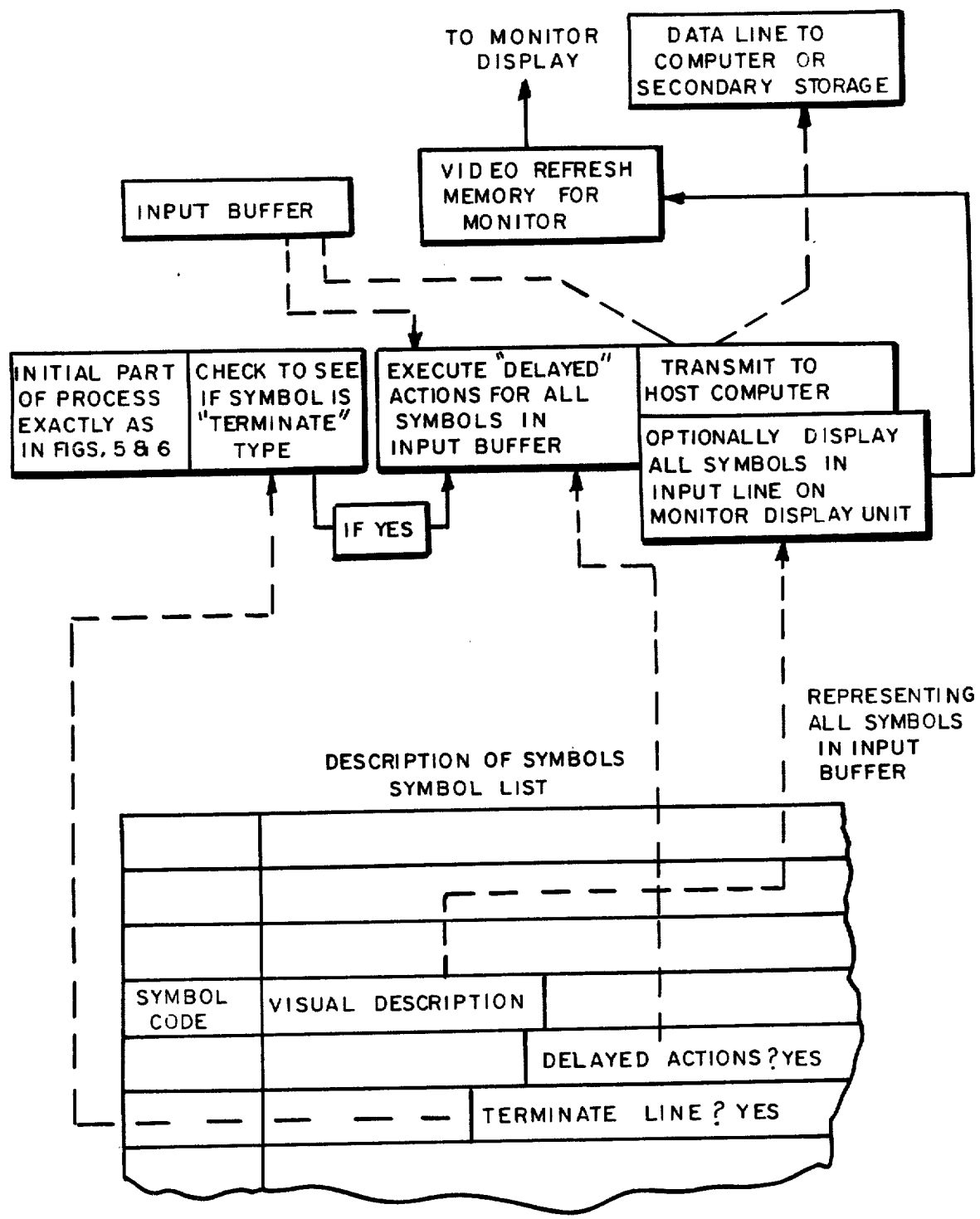

The symbol description is shown in more detail in FIGS. 6 and 7, and includes data concerning the symbol's visual appearance, if applicable, and any symbol action associated therewith, if applicable. Thus, as discussed above, with reference to the Terminal Definition Language, the symbol statement or description contains operators which define the visual appearance and actions, if any, of the symbol. FIG. 6 shows schematically the operations associated with processing individual symbols during the accumulation of an input line, i.e. before a symbol with a "terminate" attribute is actuated. FIG. 7 shows schematically the operations which occur after termination of the input line including, for example, transmission of the symbol codes for the accumulated symbols and execution of actions delayed until that point.

With further reference to the symbol definition, the symbol statement includes an indication as to whether or not the symbol is to be transmitted as soon as the key has been pushed at the keyboard (immediate) or whether it should be added to the symbol input buffer for display at the keyboard, but held for editing until a "terminate" symbol occurs. If the symbol is an immediate action symbol, the action is performed when the key is activated while otherwise the symbol is so held for editing while being displayed at the keyboard image display unit. Once a terminate type symbol is activated, all of the delayed "terminal" actions are executed for the symbols which have been placed in the symbol input buffer, and the associated symbol codes are transmitted. If a symbol has the "attention" attribute such statement will be processed on a priority basis, as mentioned above in connection with the description of the Terminal Definition Language.

The symbol statement will also indicate whether or not the symbol code is ever to be transmitted or whether it should be retained locally as discussed with reference to the Terminal Definition Language. The symbol statement optionally allows an alternative list of symbol codes to be transmitted instead of the normally assigned symbol code for a given symbol, also as discussed above in connection with the Terminal Definition Language. Similarly, the terminal can also receive from an external source, such as a "host" computer, e.g. for output on the display monitor, alternative lists of symbol codes representing a particular symbol.

Figure 8:
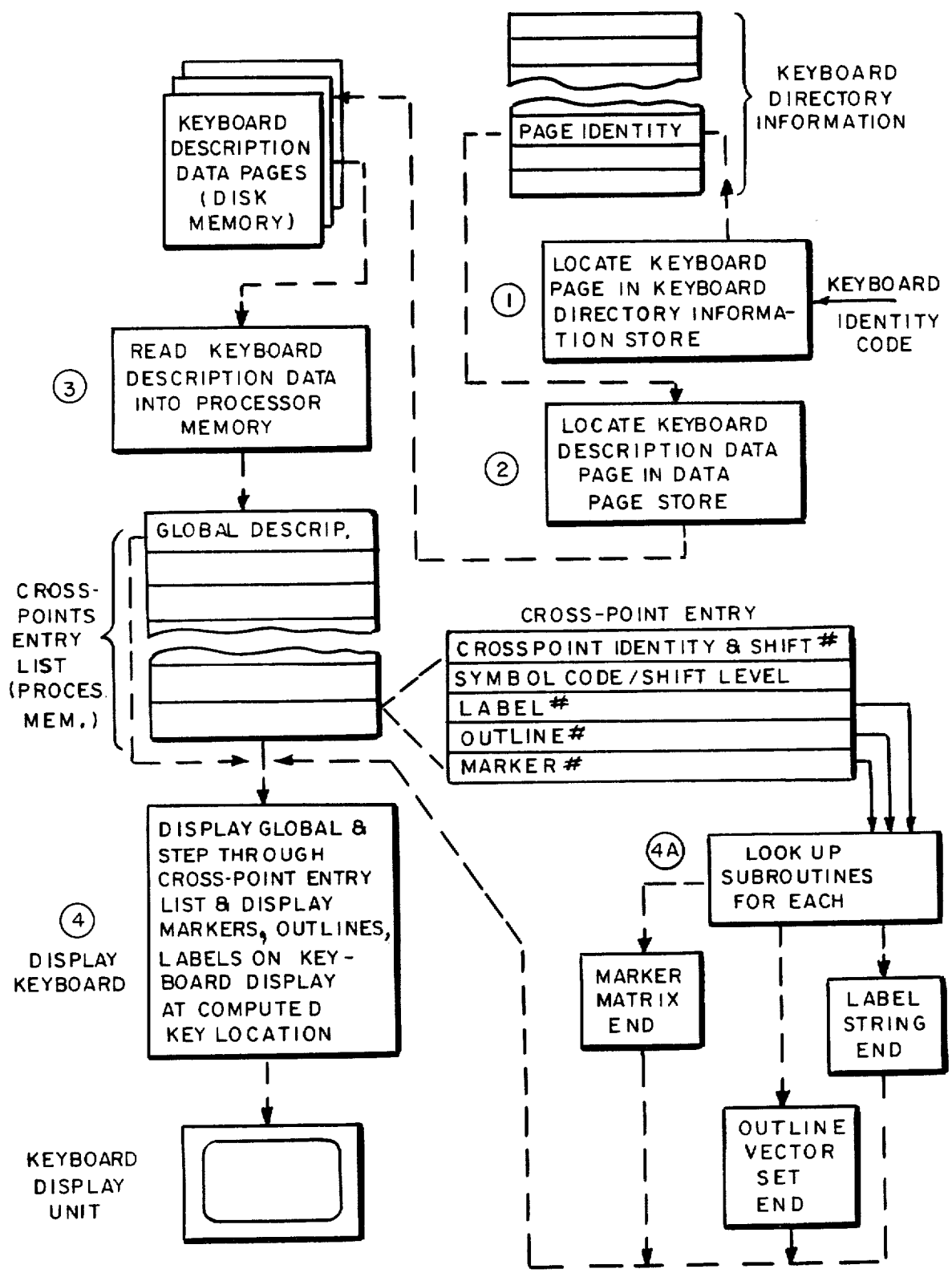
FIG. 8 is a diagrammatic representation of the operation required to change a keyboard image at the keyboard display unit.

FIG. 8 describes the operation of the system with respect to the changing of a keyboard image at the display unit. As discussed above, descriptions of all of the keyboards of the entire working set thereof are retained in the disk memory at appropriate data pages thereof. The data base further includes keyboard directory information which for a particular keyboard designation identifies the data page in the keyboard description data base at which a particular identified keyboard is stored. Accordingly, once the keyboard identity code is activated by the user, the keyboard data page associated with the identified keyboard is located in the keyboard directory information in the data base. The page identification thereupon locates the keyboard description in the data base of the disk memory and the keyboard description is thereupon transmitted from the disk memory into the processor memory. Such description lists each of the live cross points of the particular selected keyboard and the appropriate information associated therewith. In addition, the description of the keyboard "global", if applicable, is also included.

Thus for an exemplary cross point entry, the information associated therewith will include the cross point identity, the shift number or the symbol code associated with such cross point. The outline of the key, the marker and the label associated therewith are also included in the cross point entry of the keyboard description.

The keyboard is then displayed by appropriately stepping through the cross point entry list and displaying the identified markers, outlines, and labels associated therewith on the keyboard display unit at each identified cross point location. In addition, the "global" is also displayed, which global since it is always displayed at the same location in each keyboard, is not associated with any specified cross point on the cross point entry list. Once the label, outline, and marker associated with each cross point are identified by an appropriate code in the keyboard description such code permits the processor to look up the procedures associated with each of the displays associated therewith. Accordingly, such procedures, for example, provide an appropriate string for the label, a suitable vector set for the outline, and a selected matrix for the marker, as applicable, so that the keyboard is thereupon suitably drawn on the keyboard display unit.

Figure 9:
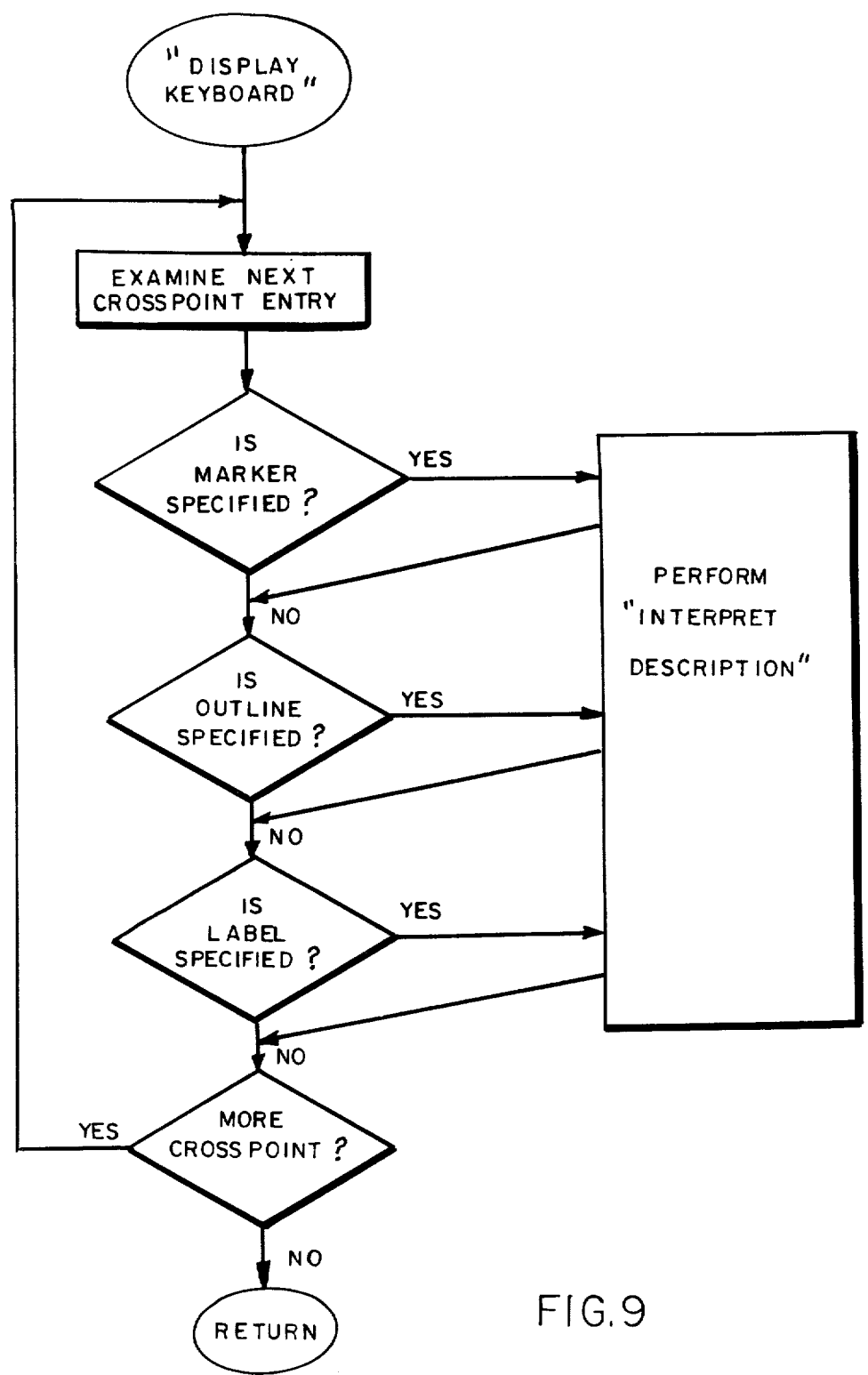
FIGS. 9 and 10 are flow charts depicting the steps required in a portion of the operation shown in FIG. 8.

The "Display Keyboard" step depicted in FIG. 8 is shown in more detail by the flow chart of FIG. 9 which, as depicted therein, shows that each cross point entry is sequentially examined and, if a marker is specified, it is appropriately interpreted and a description thereof provided so that the marker can be displayed. Similarly if an outline is specified, or if a label is specified, such outline and label are also appropriately interpreted for display. Such operation occurs for each cross point until all of the cross points have been examined in which case the subroutine returns to the main processor routine.

Figure 10:
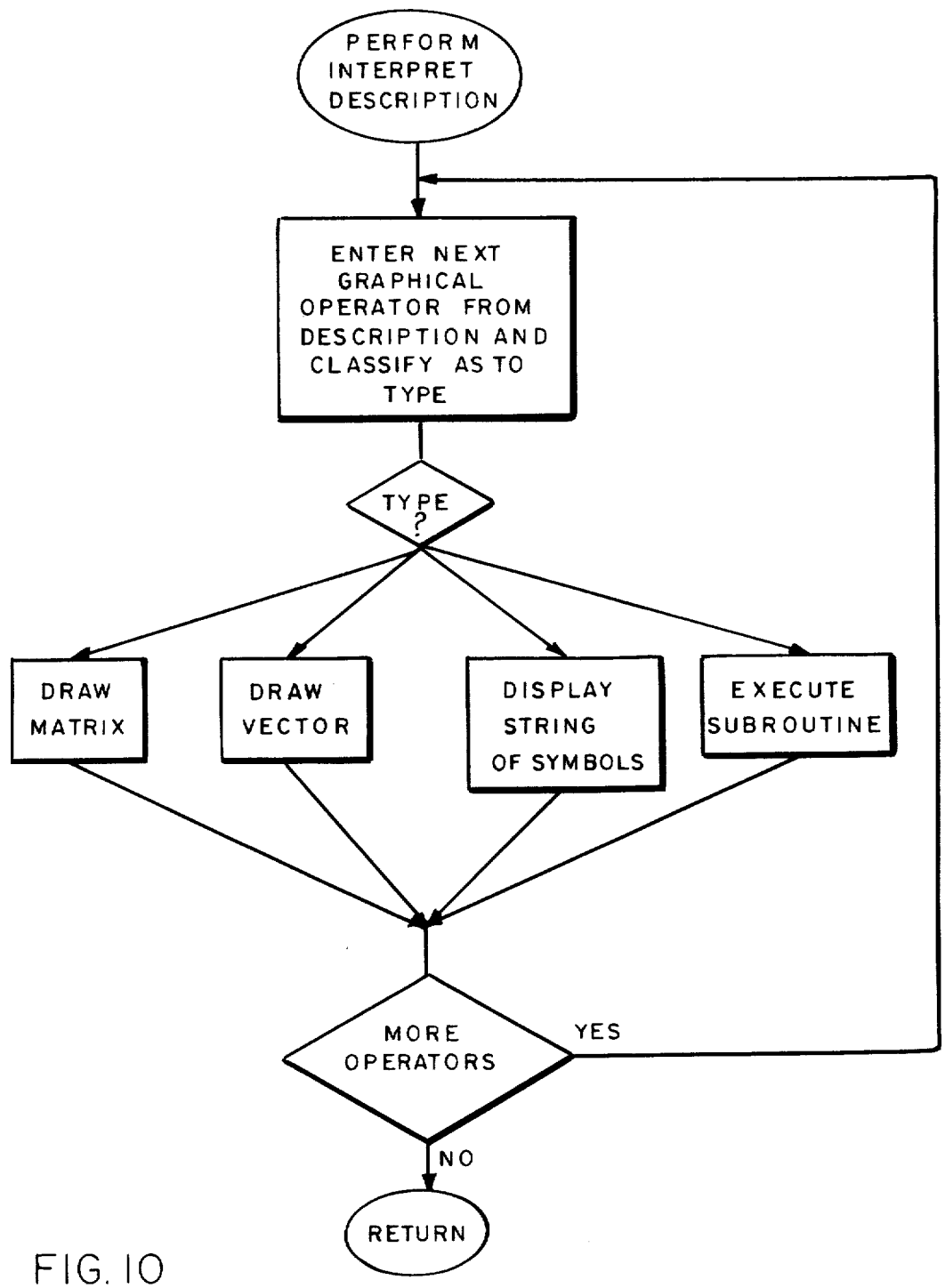

The "display interpretation" required for displaying such elements of the keyboard is shown in more detail by the flow chart in FIG. 10. As can be seen therein, the operators are first classified as to the type (i.e. marker, label or outline). Once the operator type has been appropriately identified, the subroutines for drawing the particular pattern required are thereupon executed (i.e. a matrix for the marker, a vector, or set of vectors, for the outline, and a string of symbols for a label). Such operators are sequentially drawn as required until all applicable ones have been displayed. When the completion of the display of all the operators has occurred the subroutine then returns to the main processor routine.

FIGS. 11 through 14 show a typical keyboard and displays as may occur during operation of the system by a keyboard user. FIG. 11, for example, depicts a keyboard which is identified by the keyboard global "CHOOSE A DEMONSTRATION!". In accordance with such exemplary keyboard, the user can select for display and use any one of six other keyboard images specified at the left thereof.

The keys associated therewith, which can be activated by the user, are each defined by an appropriate label, outline and marker as indicated thereon. Thus if the user wishes to change to the keyboard identified as "LEARNING TO READ" he merely pushes the key which is so defined by the appropriate label, outline and marker; this key is associated with a symbol which has, as an action component, a call to the "change keyboard" routine with the desired keyboard name as an argument. Thus, the result is an immediate change to the desired keyboard. Additional keys permit the operator to perform other actions. Thus, if the operator pushes the key labeled "HELP" a description of the manner in which the currently displayed keyboard can be used is substantially displayed on the monitor display unit. The monitor display can be deleted by pushing the "CLEAR DISPLAY" key. If the user wishes to obtain a printout of what is displayed on the monitor display unit, he merely has to push the key labeled "PRINT DISPLAY".

Figure 12:
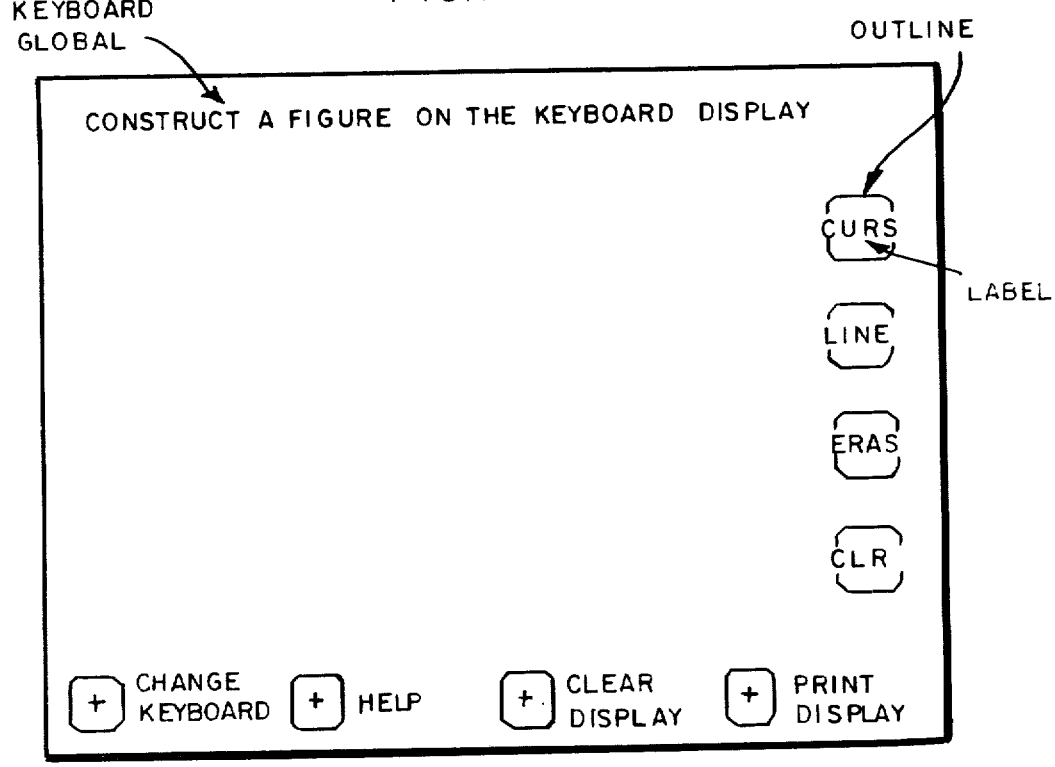

If it is assumed, for example, that the user pushes the key labeled "DRAWING ON THE KEYBOARD" the currently displayed keyboard is then removed from the keyboard display unit and the keyboard shown in FIG. 12 is thereupon displayed via the "change keyboard" process discussed above.

As can be seen therein the keyboard global is "CONSTRUCT A FIGURE ON THE KEYBOARD DISPLAY" and the keyboard has 8 explicitly active keys. The keys to the right which permit the operator to construct a figure on the keyboard display unit include both an outline and a label but do not have specific markers associated therewith. The 4 keys at the lower part of the same type shown with respect to FIG. 11 and include outlines, labels, and markers.

In the particular keyboard as shown in FIG. 12 a cursor associated therewith can be moved to any cross point on the keyboard by merely having the user touch the particular desired cross point and subsequently touch the "CURS" key. A line can be drawn from the present position of the cursor to another cross point by merely touching the latter cross point and then touching the "LINE" key. Any particular line can be erased by moving the cursor to one end of the line and touching the cross point at the other end of the line which is to be erased and thereupon touching the "ERAS" key.

Thus, a figure such as shown in FIG. 13 can be constructed the keyboard display unit. For example, the cursor can be placed first at point 1 using the "CURS" key and a line drawn therefrom to point 2 and a subsequent line thereupon drawn to point 3, etc. using the "LINE" key.

Figure 14:
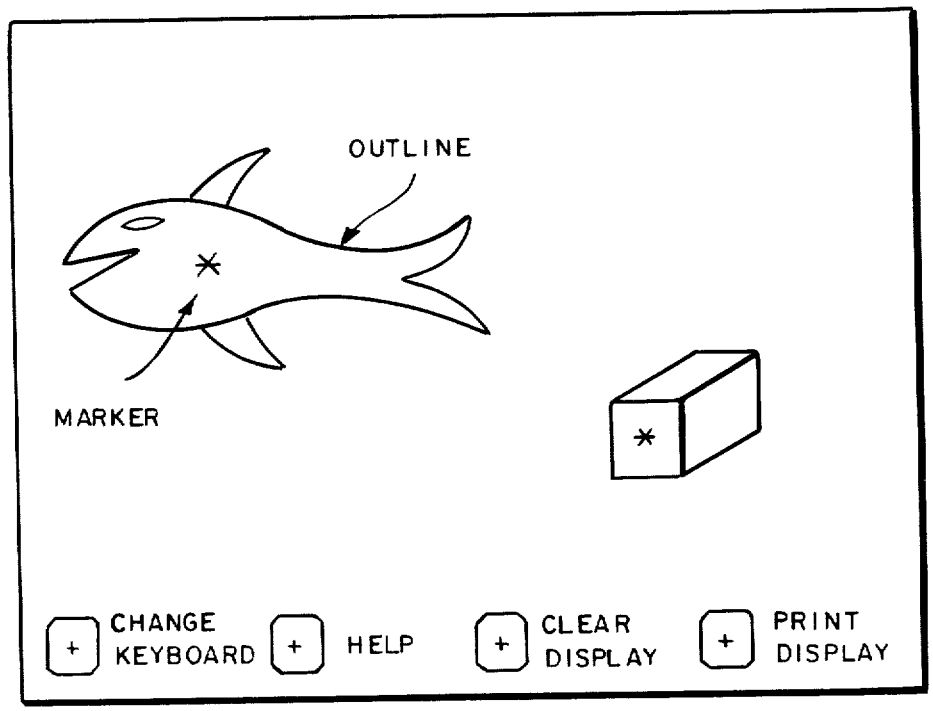
Figure 15:
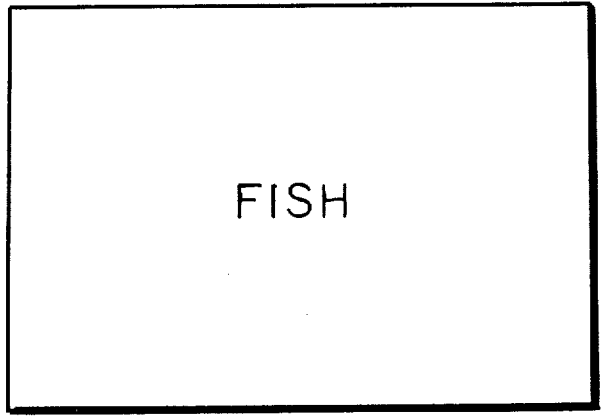

If, as another example, in the keyboard shown in FIG. 11 the user activates the "LEARNING TO READ" key, the keyboard shown in FIG. 14 appears on the keyboard display unit. In this case there are effectively only 2 "live" keys, neither having a label but both having an outline and a marker associated therewith. If the key is activated by pushing the keyboard at the marker point the processor thereupon displays a word associated with such key on the monitor display unit. In this case, for example, pushing the marker associated with the fish outline causes the word "FISH" to appear at the display unit, as shown in FIG. 15. Alternatively, pushing the marker at the box outline shown at FIG. 14 would cause the word "BOX" to appear on the monitor display unit.

The above keyboards are shown as exemplary ones only and illustrate in a relatively simplified manner sample types of keyboards that can be defined by a user and then ultimately used by an operator of the system.

What is claimed is:

1. A dynamic keyboard terminal system comprising
  a memory means for storing a data base comprising information concerning symbols and keyboard images, wherein said symbol information includes at least a symbol code for identifying said symbol and symbol description information describing said symbol, said description information including at least information defining a symbol configuration or information defining an action associated with said symbol and wherein said keyboard information includes at least a description of the keys involved in said keyboard image, each said key description including at least the location of the key, the appearance of the key, and the symbol code associated with the key;
  input means comprising a panel means having a keyboard image and a plurality of touch-sensitive locations which can be activated by a user in a manner such that selected combinations of activated touch-sensitive locations corresponding to symbols available in said data base can provide information concerning the modification of previously available symbols and keyboard images or the creation of new symbols and keyboard images;
  logic means, responsive to the information concerning said modified or new symbols and keyboard images, for storing said information in said data base;
  means for displaying a selected one of said keyboard images in alignment with said panel means so tht one or more selected touch-sensitive locations are associated with each of the keys of the currently displayed keyboard image;
  accessing means, responsive to the selective activation of a key by a user, for accessing stored information concerning a selected symbol associated with said activated key or received symbol code; and
  further means, responsive to the accessed information, for displaying the configuration of said symbol and performing the associated action of said symbol.

2. A system in accordance with claim 1 and further including means capable of making symbol codes available to one or more facilities which are external to said keyboard terminal system.

3. A system in accordance with claim 1 wherein said accessing means is responsive to the consecutive touching of separate keys and to the simultaneous touching of a plurality of different keys.

4. A system in accordance with claim 3 wherein said accessing means comprises means for electronically scanning all of the touch sensitive locations of a currently displayed keyboard image and for providing a list of said touch sensitive locations which correspond to keys which have been selectively touched on said currently displayed keyboard image.

5. A system in accordance with claim 4 wherein one or more of the keys of a selected keyboard image can be associated with a plurality of different symbols, the particular ones of said symbols being selectively determined when said one or more keys of a currently displayed keyboard image is touched by a user in accordance with the touched status of one or more concurrently touched shift keys of said currently displayed keyboard image.

6. A system in accordance with claim 3 and further including means for displaying a sequence of selected symbols at a selected location on said display means to permit the editing of said sequence of selected symbols.

7. A system in accordance with claim 3 and further including means for activating only a preselected part of the configuration or associated action information of a symbol.

8. A system in accordance with claim 1 wherein said accessing means further includes means for identifying touched locations of a currently displayed keyboard image which are not defined as keys, said non-key locations being capable of use as arguments for actions to be performed in association with symbols corresponding to selected touch keys of a currently displayed keyboard image.

9. A system in accordance with claim 1 wherein the symbol code associated with a specified symbol is the same symbol code for all keys in the working keyboard image set which are associated with said symbol.

10. A system in accordance with claim 1 wherein said accessing means is capable of accepting and is responsive to a plurality of symbol codes which are transmitted thereto from sources external to said terminal system and which are contained in the stored working symbol set of said terminal system.

11. A system in accordance with claim 1 and further including means for dynamically altering the contents of a currently selected keyboard image which is being displayed at said keyboard display unit.

12. A system in accordance with claim 2 wherein the symbol information associated with the symbols of a working symbol set may include, if applicable, an alternative set of symbol codes associated with a specified symbol, said last-named means being capable of making available either the symbol code normally associated with said specified symbol or the alternative set of symbol codes associated therewith.

* * * * *